United States Patent
Lee

(10) Patent No.: US 11,546,555 B2
(45) Date of Patent: Jan. 3, 2023

(54) AROUND-VIEW IMAGE CONTROL DEVICE AND AROUND-VIEW IMAGE PROCESSING METHOD THEREFOR

(71) Applicant: LG INNOTEK CO., LTD., Seoul (KR)

(72) Inventor: Seung Won Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/649,941

(22) PCT Filed: Sep. 21, 2018

(86) PCT No.: PCT/KR2018/011308
§ 371 (c)(1),
(2) Date: Mar. 23, 2020

(87) PCT Pub. No.: WO2019/059732
PCT Pub. Date: Mar. 28, 2019

(65) Prior Publication Data
US 2020/0267351 A1 Aug. 20, 2020

(30) Foreign Application Priority Data
Sep. 22, 2017 (KR) .................. 10-2017-0122827

(51) Int. Cl.
*H04N 7/18* (2006.01)
*H04N 13/243* (2018.01)
(Continued)

(52) U.S. Cl.
CPC .............. *H04N 7/181* (2013.01); *B60R 1/00* (2013.01); *H04N 5/232* (2013.01); *H04N 5/247* (2013.01);
(Continued)

(58) Field of Classification Search
CPC ...... H04N 7/181; H04N 5/247; H04N 5/2624; H04N 13/243; H04N 5/232; B60R 1/00;
(Continued)

(56) References Cited

U.S. PATENT DOCUMENTS 5,454,045 A * 9/1995 Perkins .................... G06K 9/20
382/181
9,141,880 B2 9/2015 Ciarcia
(Continued)

FOREIGN PATENT DOCUMENTS

| CN | 101510297 A | 8/2009 |
|---|---|---|
| CN | 105313779 A | 2/2016 |

(Continued)

OTHER PUBLICATIONS

International Search Report in International Application No. PCT/KR2018/011308, filed Sep. 21, 2018.
(Continued)

*Primary Examiner* — Loi H Tran
(74) *Attorney, Agent, or Firm* — Saliwanchik, Lloyd & Eisenschenk

(57) ABSTRACT

An around-view image processing method comprises: generating a first around-view image signal obtained by image synthesis using image information acquired from a plurality of cameras; generating a second around-view image signal obtained by image correction using image information acquired from the plurality of cameras over a predetermined period of time; and outputting the second around-view image signal or outputting the first around-view and second around-view image signals. When the first around-view and second around-view image signals are output, the around-view image processing method may further comprise selecting one image signal from the first around-view and second around-view image signals, and outputting the image signal
(Continued)

selected from the first around-view and second around-view image signals.

11 Claims, 24 Drawing Sheets

(51) Int. Cl.
*B60R 1/00* (2022.01)
*H04N 5/232* (2006.01)
*H04N 5/247* (2006.01)
*H04N 5/262* (2006.01)

(52) U.S. Cl.
CPC ......... *H04N 5/2624* (2013.01); *H04N 13/243* (2018.05); *B60R 2300/105* (2013.01); *B60R 2300/20* (2013.01); *B60R 2300/607* (2013.01)

(58) Field of Classification Search
CPC .......... B60R 2300/20; B60R 2300/607; B60R 2300/105
USPC .......................................................... 348/48
See application file for complete search history.

(56) References Cited

U.S. PATENT DOCUMENTS

| | | | | |
|---|---|---|---|---|
| 2006/0202984 A1* | 9/2006 | Yang | ........................ | G06T 5/006 345/419 |
| 2009/0208128 A1* | 8/2009 | Hayashi | .................... | B60R 1/00 382/256 |
| 2010/0183245 A1* | 7/2010 | Oryoji | .................... | H04N 7/014 382/299 |
| 2011/0285856 A1 | 11/2011 | Chung | | |
| 2013/0307982 A1 | 11/2013 | Kawai | | |
| 2013/0322783 A1* | 12/2013 | Kang | ...................... | G06T 11/60 382/284 |
| 2013/0329005 A1* | 12/2013 | Shih | ........................ | H04N 7/183 348/36 |
| 2014/0099035 A1* | 4/2014 | Ciarcia | ................ | G06K 9/6211 382/216 |
| 2015/0066237 A1* | 3/2015 | Kwon | ...................... | B60R 1/00 701/1 |
| 2015/0193916 A1 | 7/2015 | Jin | | |
| 2015/0353011 A1* | 12/2015 | Baek | ...................... | H04N 7/181 348/148 |
| 2015/0360612 A1* | 12/2015 | Lee | .......................... | B60R 1/00 348/148 |
| 2018/0060669 A1* | 3/2018 | Pham | ........................ | G06T 7/11 |
| 2018/0150082 A1* | 5/2018 | Jang | .................... | G06K 9/00805 |

FOREIGN PATENT DOCUMENTS

| | | |
|---|---|---|
| JP | 2008-042390 A | 2/2008 |
| JP | 2015-011645 A | 1/2015 |
| KR | 10-2013-0064169 A | 6/2013 |
| KR | 10-2013-0135538 A | 12/2013 |
| KR | 10-1579100 B1 | 12/2015 |
| KR | 10-2016-0051129 A | 5/2016 |
| KR | 10-1709009 B1 | 2/2017 |

OTHER PUBLICATIONS

Office Action dated Mar. 26, 2021 in Chinese Application No. 201880071041.6.
Supplementary European Search Report dated Apr. 7, 2021 in European Application No. 18858500.4.
Office Action dated Sep. 28, 2022 in European Application No. 18 858 500.4.

* cited by examiner

Vanishing point

AROUND-VIEW IMAGE CONTROL DEVICE AND AROUND-VIEW IMAGE PROCESSING METHOD THEREFOR

CROSS-REFERENCE TO RELATED APPLICATIONS

This application is the U.S. national stage application of International Patent Application No. PCT/KR2018/011308, filed Sep. 21, 2018, which claims the benefit under 35 U.S.C. § 119 of Korean Application No. 10-2017-0122827, filed Sep. 22, 2017, the disclosures of each of which are incorporated herein by reference in their entirety.

TECHNICAL FIELD

Embodiments relate to an around-view image control device and an around-view image correction method thereof.

BACKGROUND ART

Vehicles are all apparatuses traveling by driving wheels for the purpose of transporting people or freight. A general example of the vehicle may include an automobile.

Vehicles may be classified into internal combustion engine vehicles, external combustion engine vehicles, gas turbine vehicles or electric vehicles, according to the type of a used motor.

Electric vehicles use electricity as an energy source to drive electric motors, and may be classified into electric vehicles, hybrid electric vehicles (HEVs), plug-in hybrid electric vehicles (PHEV), fuel cell electric vehicles (FCEVs), etc.

Recently, for safety and convenience of drivers or pedestrians, smart vehicles have been actively developed and commercialized. The smart vehicles are state-of-the-art vehicles combined with information technology (IT), which not only introduces an advanced system of the vehicle itself but also provides optimal traffic efficiency through linkage with an intelligent transportation system. Specifically, the smart vehicles maximize safety and convenience of drivers, passengers and pedestrians, by performing automatic driving, adaptive cruise control (ACC), obstacle detection, collision detection, precise map provision, settings of routes to destinations, provision of locations of main places, etc.

As a device for maximizing safety and convenience of drivers, passengers and pedestrians, an around-view control device is attracting attention.

The around-view control device provides an around-view image of a vehicle using a camera, and a driver may look around the vehicle in real time through the around-view image.

Since the around-view image is generated by synthesizing images acquired by cameras in different directions, matching between adjacent images is very important.

However, if various external environmental factors (e.g., people riding, external shock, aging, etc.) are changed during driving or a camera or a device for controlling the camera is replaced, matching information is changed, thereby disabling matching between adjacent images. Disabling matching means mismatching.

When mismatching between images occurs, a correction operation is required. The same problem may occur in vehicle released without the correction operation.

In the related art, after a correction pattern is placed on the ground, the correction operation is performed by comparing a measured value obtained from the correction pattern with a reference correction pattern.

However, in the related art, in order to perform the correction operation, since the correction pattern is placed in a row on both sides of the ground and then the measured value is obtained from the correction pattern while the vehicle travels, a wide space is required. In addition, since an operator needs to place the correction pattern on both sides of the ground whenever the correction operation is performed, it may be difficult to automate the correction operation.

In addition, in the related art, when the correction operation is necessary, a driver has to go to a service center, thereby causing cumbersomeness. Therefore, since many drivers use around-view images having borders distorted by incorrect information without visiting service centers, accidents may be caused due to misjudgment of drivers.

INVENTION

Technical Problem

An object of embodiments is to solve the above-described problems and the other problems.

Another object of embodiments is to provide an around-view image control device capable of performing correction without space restriction, and an around-view image correction method thereof.

Another object of embodiments is to provide an around-view image control device capable of performing correction without place restriction, and an around-view image correction method thereof.

Another object of embodiments is to provide an around-view image control device capable of performing correction without time restriction, and an around-view image correction method thereof.

Another object of embodiments is to provide an around-view image control device capable of easily updating an around-view image after correction, and an around-view image correction method thereof.

Technical Solution

According to an aspect of embodiments, a method of processing an around-view image includes generating a synthesized first around-view image signal using image information acquired from a plurality of cameras, generating a corrected second around-view image signal using image information acquired from the plurality of cameras during a predetermined time, and outputting the second around-view image signal or the first and second around-view image signals. In addition, the method may further include selecting one of the first and second around-view image signals when the first and second around-view image signals are output, and outputting the selected image signal of the first and second around-view image signals.

According to another aspect of embodiments, an around-view image control device includes a plurality of cameras, and a controller electrically connected to the cameras and configured to control an image signal using information acquired from the cameras. The controller may be configured to generate a synthesized first around-view image signal using image information acquired from the plurality of cameras, generate a corrected second around-view image signal using image information acquired from the plurality of cameras during a predetermined time, and output the second around-view image signal or the first and second around-view image signals.

Effect of the Invention

The effects of the around-view image control device and the around-view image correction method therefor according to embodiments will be described below.

According to at least one of the embodiments, since image mismatching is automatically corrected by simply driving a vehicle, it is possible to easily perform image correction.

According to at least one of the embodiments, it is possible to correct image mismatching without space, time, and place restriction.

According to at least one of the embodiments, since an around-view image is automatically updated after image correction, it is possible to easily update the around-view image.

Further scope of applicability of the embodiments will become apparent from the following detailed description. However, various changes and modifications within the spirit and scope of the embodiments can be clearly understood by those skilled in the art and thus specific embodiments such as detailed description and preferred embodiments should be understood as being given only as examples.

BEST MODE

Figure 1:
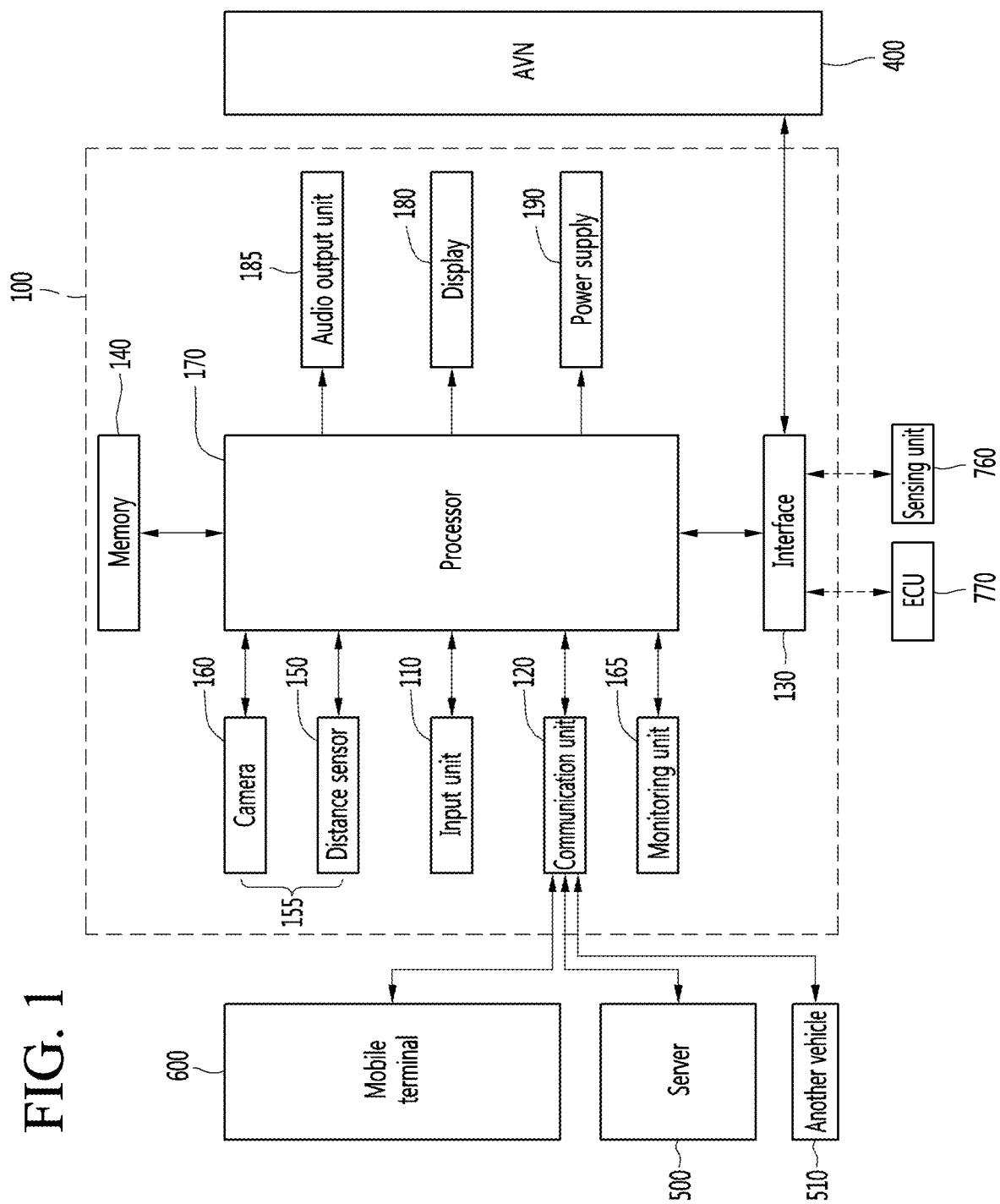
FIG. 1 is a block diagram showing the configuration of an around-view image control device according to an embodiment.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

The term "vehicle" used in the present disclosure may include all types of vehicles such as a car and a motorbike. Hereinafter, for example, a car will be described.

In the present disclosure, a vehicle may be any of an internal combustion vehicle equipped with an engine as a power source, a hybrid vehicle equipped with an engine and an electrical motor as power sources, an electric vehicle equipped with an electrical motor as a power source, and the like.

In the following description, the left of a vehicle means the left of a driving direction of the vehicle, and the right of the vehicle means the right of the driving direction of the vehicle. In the following description, the vehicle refers to a left hand drive (LHD) vehicle in which a steering wheel is located on the left, unless mentioned otherwise.

An around-view image control device described in this specification may be a separate device provided in a vehicle and is defined as a device for exchanging necessary information through data communication with the vehicle and providing an around-view image of an object around the vehicle. The around-view image control device may be released in a state of being installed in a vehicle by a manufacturer or may be installed by a driver or a third party after the vehicle is released. However, in some embodiments, the around-view image control device may include a set of some of the components of the vehicle to configure a part of the vehicle.

The around-view image is an image showing the surroundings of the vehicle and may also be referred to as a top view or a bird view. Such an around-view image may be generated based on images acquired in different directions.

When the around-view image control device is a separate device, at least some of the components (see FIG. 1) of the around-view image control device may be an external component which is not included in the around-view image control device but is included in a vehicle or another device installed in the vehicle. Such external components may be understood as configuring the around-view image control device, by transmitting and receiving data through an interface of the around-view image control device.

For convenience of description, in this specification, the around-view image control device will be described as directly including the components shown in FIG. 1.

Hereinafter, an around-view image control device according to an embodiment will be described in detail with reference to the accompanying drawings.

FIG. 1 is a block diagram showing the configuration of an around-view image control device according to an embodiment.

Referring to FIG. 1, the around-view image control device 100 may include a sensing unit 155 and a processor 170. In addition, the around-view image control device 100 according to the embodiment may further include at least one of an input unit 110, a communication unit 120, an interface 130, a memory 140, a monitoring unit 165, a display 180, an audio output unit 185 or a power supply 190. However, the components shown in FIG. 1 are not essential for implementing the around-view image control device 100 and thus the around-view image control device 100 according to the embodiment may have more or less components than the components listed above.

The components will be described in detail. The input unit 110 may detect user input. For example, a user may input settings of an around-view image provided by the around-view image control device 100 through the input unit 110 or turn on/off the power of the around-view image control device 100.

The input unit 110 may include at least one of a gesture input unit (e.g., an optical sensor, etc.) for detecting a user's gesture, a touch input unit (e.g., a touch sensor, a touch key, a mechanical key, etc.) for detecting touch, or a microphone for detecting voice input, and detect user input.

The communication unit 120 may communicate with another vehicle 510, a mobile terminal 600 and a server 500.

In this case, the around-view image control device 100 may receive at least one of navigation information, traveling information of another vehicle or traffic information through the communication unit 120. In addition, the around-view image control device 100 may transmit information on a subject vehicle including the around-view image control device 100 through the communication unit 120.

Specifically, the communication unit 120 may receive location information, weather information and road traffic state information, (e.g., Transport Protocol Experts Group (TPEG) information), from the mobile terminal 600 or the server 500.

In addition, the communication unit 120 may receive traffic information from the server 500 having an intelligent transportation system (ITS). Here, the traffic information may include traffic signal information, lane information, vehicle surrounding information or location information.

The communication unit 120 may transmit navigation information to the mobile terminal 600 and/or the server 500. Here, the navigation information may include at least one of map information related to vehicle traveling, lane information, vehicle location information, set destination information or route information according to a destination.

For example, the communication unit 120 may receive real-time location of the vehicle as navigation information. Specifically, the communication unit 120 may include a GPS (Global Positioning System) module and/or a Wi-Fi (Wireless Fidelity) module and acquire the location of the vehicle.

In addition, the communication unit 120 may receive driving information of another vehicle 510 from another vehicle 510 and transmit information on the subject vehicle to another vehicle 510, thereby sharing driving information between the vehicles. Here, the shared driving information may include at least one of vehicle movement direction information, location information, vehicle speed information, acceleration information, movement path information, vehicle forward/reverse information, adjacent vehicle information or turn signal information.

In addition, when a user gets into the vehicle, the mobile terminal 600 of the user and the around-view image control device 100 may pair with each other automatically or as the user executes an application.

The communication unit 220 may exchange data with another vehicle 510, the mobile terminal 600 or the server 500 in a wireless manner.

Specifically, the communication unit 120 may perform wireless communication using a wireless data communication method. As the wireless data communication method, technical standards or communication methods for mobile communication (e.g., GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), etc.) may be used.

In addition, the communication unit 120 may use wireless Internet technology and use, for example, WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced), etc. as the wireless Internet technology.

In addition, the communication unit 120 may use short range communication, and support short range communication using at least one of Bluetooth™, RFID (Radio Frequency Identification), Infrared Data Association (IrDA), UWB (Ultra Wideband), ZigBee, NFC (Near Field Communication), Wi-Fi (Wireless-Fidelity), Wi-Fi Direct, Wireless USB (Wireless Universal Serial Bus) technology.

In addition, the around-view image control device 100 may pair with the mobile terminal 600 inside the vehicle using the short range communication method and wirelessly exchange data with another vehicle 510 or the server 500 using a long-distance wireless communication module of the mobile terminal 600

The interface 130 may perform internal/external interface of the around-view image control device 100, such as reception of data from an electronic control unit (ECU) 770 for overall control of the vehicle or transmission of a signal processed or generated by the processor 170 to the outside.

Specifically, the around-view image control device 100 may receive at least one of vehicle driving information, navigation information or sensing information through the interface 130.

In addition, the around-view image control device 100 may transmit a control signal for around-view execution or information generated by the around-view image control device 100 to the ECU 770 of the vehicle through the interface 130.

The interface 130 may perform data communication with at least one of the ECU 770, an AVN (Audio Video Navigation) device 400 or the sensing unit 760 inside the vehicle using a wired or wireless communication method.

Specifically, the interface 130 may receive navigation information by data communication with the ECU 770, the AVN device 400 and/or a separate navigation device (not shown).

In addition, the interface 130 may receive sensing information from the ECU 770 or the sensing unit 760.

Here, the sensing information may include at least one of vehicle direction information, vehicle speed information, acceleration information, tilt information, forward/reverse information, fuel information, information on a distance from front/rear vehicle, information on a distance between the vehicle and a lane or turn signal information.

The sensing information may be acquired by a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor based on rotation of the steering wheel, a vehicle interior temperature sensor, a vehicle interior humidity sensor, a door sensor, etc. The position module may include a GPS module for receiving GPS information.

The interface 130 may receive user input through a user input unit 724 of the vehicle. In this case, the interface 130 may receive user input from an input unit 724 of the vehicle directly or through the ECU 770 of the vehicle.

In addition, the interface 130 may receive the acquired traffic information from the server 500. The server 500 may be located at a traffic control station for controlling traffic. For example, when traffic information is received from the server 500 through a communication unit 710 of the vehicle, the interface 130 may receive the traffic information from the ECU 770 of the vehicle.

The memory 140 may store a variety of data for overall operation of the around-view image control device 100, such as programs for processing or controlling the processor 170.

In addition, the memory 140 may store a plurality of application programs or applications executed in the around-view image control device 100 or data or commands for operation of the around-view image control device 100. At least some of such application programs may be downloaded from an external server through wireless communication. In addition, at least some of such application programs may be already located in the around-view image control device 100 in the factory, for the basic function (e.g., a vehicle periphery guidance function) of the around-view image control device 100.

Such application programs may be stored in the memory 140 and driven by the processor 170 to perform operation (or function) of the around-view image control device 100.

The memory 140 may store data for identifying an object included in an image. For example, when a predetermined object is detected in the surrounding image of the vehicle acquired through a camera 160, the memory 140 may store data for identifying what the object corresponds to by various algorithms.

For example, the memory 140 may store a comparison image and comparison data for determining whether the object included in the image acquired through the camera 160 corresponds to a lane, a traffic sign, a two-wheeled vehicle or a pedestrian.

In addition, the memory 140 may store predetermined synthesis information or view information used to generate an around-view image.

The around-view image may be generated by synthesizing images acquired in different directions. At this time, range information and border line information of a synthesis region generated from the images may be stored in the memory 140 as synthesis information.

The view information may be information on a direction viewed from the camera, without being limited thereto.

The memory 140 may include at least one type of storage medium, such as a flash memory type, hard disk type, SSD (Solid State Disk) type, SDD (Silicon Disk Drive) type, multimedia card micro type or card type of memory (e.g., an SD or XD memory, etc.), a random access memory (RAM), a static random access memory (SRAM), a read-only memory (ROM), an electrically erasable programmable read-only memory (EEPROM), PROM (programmable read-only memory), a magnetic memory, a magnetic disc, an optical disc, etc.

In addition, the around-view image control device 100 may operate in association with a web storage for performing the storage function of the memory 140 on the Internet.

The monitoring unit 165 may acquire information on the internal situation of the vehicle.

Information detected by the monitoring unit 165 may include at least one of face recognition information, fingerprint information, iris-scan information, retina-scan information, hand geometry information, or voice recognition information. In addition, the monitoring unit 165 may include other sensors for detecting such biometric information.

The around-view image control device 100 may further include a sensing unit 155 for detecting an object around the vehicle. In some embodiments, the around-view image control device 100 may receive sensing information obtained by the sensing unit 760 of the vehicle through the interface 130. The obtained sensing information may be included in the surrounding information of the vehicle.

The sensing unit 155 may include at least one of a distance sensor 150 for detecting the location of an object around the vehicle or the camera 160 for capturing and acquiring the image of the surrounding of the vehicle.

The distance sensor 150 may accurately detect the position of an object adjacent to the subject vehicle, a direction of the object spaced apart therefrom, a distance from the vehicle, a movement direction of the object, etc. The distance sensor 150 may continuously measure the position of the detected object, thereby accurately detecting change in positional relationship with the vehicle.

The distance sensor 150 may detect an object located in at least one of the front, rear, left or right region of the vehicle. To this end, the distance sensor 150 may be disposed at various locations of the vehicle.

The distance sensor 150 may include at least one of various types of sensors capable of distance measurement, such as a Lidar sensor, a laser sensor, an ultrasonic sensor, a stereo camera, etc.

For example, the distance sensor 150 is a laser sensor, which may accurately measure the positional relationship between the vehicle and the object using time-of-flight (TOF) and/or phase shift according to a laser signal modulation method.

Information on the object may be acquired by, at the processor 170, analyzing the image captured by the camera 160. Specifically, the around-view image control device 100 may detect the object around the vehicle, determine the attributes of the object, and generate the sensing information, by capturing the image of the surroundings of the vehicle through the camera 160 and analyzing the image of the surroundings of the vehicle through the processor 170.

Here, the object information may be at least one of the type of the object, traffic signal information displayed by the object, a distance between the object and the vehicle and the position of the object, and may be included in the sensing information.

Specifically, the processor 170 may generate the object information, by detecting an object from the captured image through image processing, tracking the object, measuring a distance from the object and identifying the object, that is, analyzing the object.

Although not shown, the sensing unit 155 may further include an ultrasonic sensor. The ultrasonic sensor may include a plurality of ultrasonic sensors, without being limited thereto. The object around the vehicle may be detected based on a difference between an ultrasonic wave transmitted by each ultrasonic sensor and an ultrasonic wave received after the transmitted ultrasonic wave is reflected by the object.

The processor 170 may provide an around-view image of the vehicle viewed from the top by synthesizing images captured in all directions.

In order to enable the processor 170 to more easily perform object analysis, in the embodiment, the camera 160 may be a stereo camera for measuring a distance from the object while capturing an image.

The camera 160 may directly include an image sensor and an image processing module. In this case, the camera 160 may process a still image or a moving image obtained by the image sensor (e.g., a CMOS or a CCD). In addition, the image processing module may process the still image or the moving image obtained through the image sensor, extract necessary image information, and transmit the extracted image information to the processor 170.

The sensing unit 155 may be a stereo camera obtained by coupling the distance sensor 150 with the camera 160. That is, the stereo camera may acquire an image and, at the same time, detect a positional relationship with the object.

The display 180 may display the around-view image. The display 180 may include at least one display region as necessary. Different image information may be displayed in the display regions.

The audio output unit 185 may output a message for checking description, execution, etc. of the around-view image as an audio. Therefore, the around-view image control device 100 may complement description of the function of the around-view image control device 100 through visual display using the display 180 and audio output of the audio output unit 185 with each other.

In some embodiments, the around-view image control device 100 may further include a haptic output unit (not shown) for outputting a haptic signal. The haptic output unit (not shown) may output an alarm for the around-view image in the haptic form. For example, when a warning to the driver is included in at least one of navigation information, traffic information, communication information, vehicle status information, advanced driver assistance system (ADAS) information or the other driver convenience information, the around-view image control device 100 may inform the user of the warning in the form of vibration.

The haptic output unit (not shown) may provide vibration with directionality. For example, the haptic output unit (not shown) may be disposed in the steering for controlling steering to output vibration. When vibration is provided, the haptic output unit may output vibration differently according to left and right of steering, thereby giving directionality of haptic output.

The power supply 190 may receive power from an external power source or an internal power source and supply power necessary for operation of the components, under control of the processor 170.

The processor 170 may control overall operation of the components in the around-view image control device 100.

In addition, the processor 170 may control at least some of the components included in the around-view image control device 100 or combine and operate at least two of the components, in order to execute an application program.

The processor 170 may be implemented in at least one of ASICs (application specific integrated circuits), DSPs (digital signal processors), DSPDs (digital signal processing devices), PLDs (programmable logic devices), FPGAs (field programmable gate arrays), controllers, micro-controllers, microprocessors 170, or electric units for performing the other functions, in hardware.

In some embodiments, the processor 170 may be controlled by the ECU 770 of the vehicle.

The processor 170 generally controls overall operation of the around-view image control device 100 in addition to operation related to the application program stored in the memory 140. The processor 170 may provide or process information or functions appropriate to a user, by processing signals, data, information, etc. input or output through the above-described components or executing the application program stored in the memory 170.

Figure 2A:
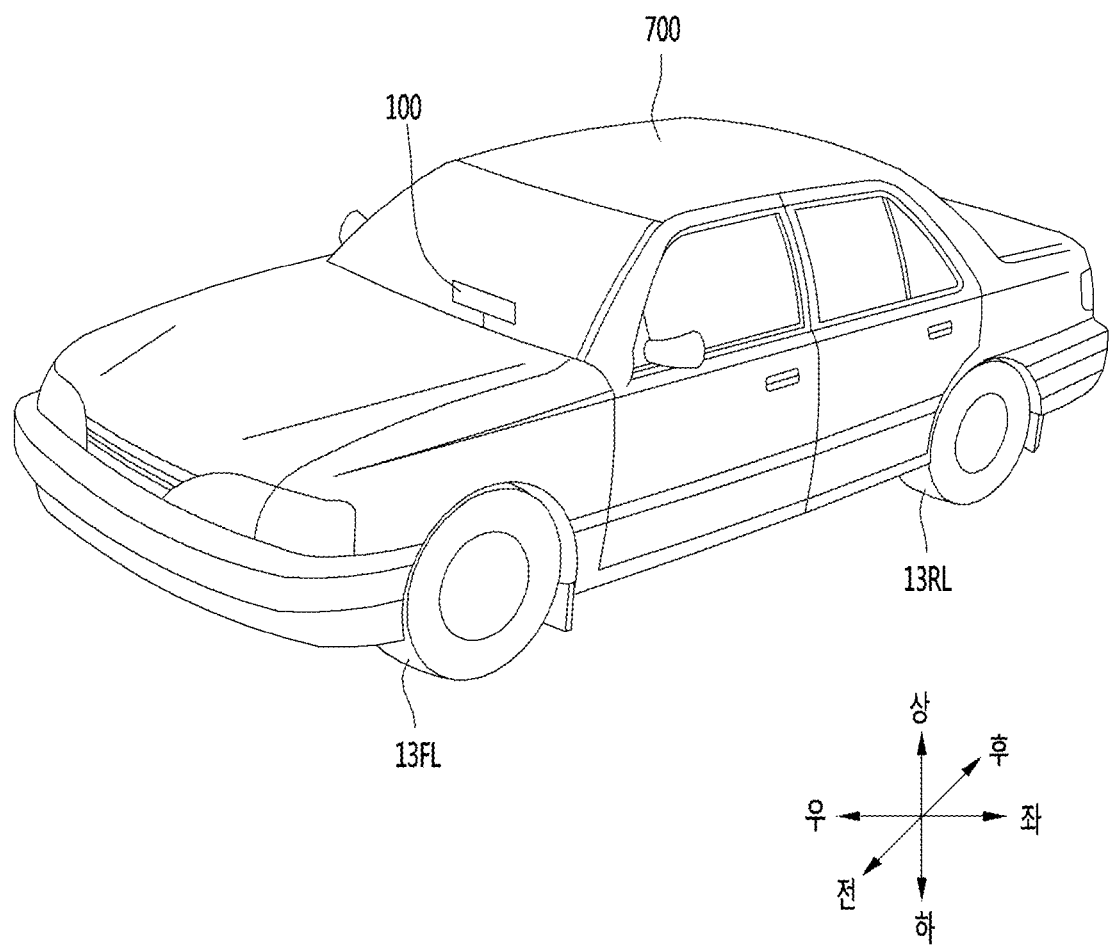
FIG. 2a is a view showing the appearance of a vehicle including an around-view image control device according to an embodiment.

FIG. 2a is a view showing the appearance of a vehicle including an around-view image control device according to an embodiment.

Referring to FIG. 2a, the vehicle 700 according to the embodiment includes wheels 13FL and 13RL rotated by a power source and an around-view image control device 100 for providing a user with information on an object around the vehicle.

The around-view image control device 100 may be installed inside the vehicle 700. In this case, the installation position of the around-view image control device 100 may be variously set according to embodiments. Referring to FIG. 2a, the around-view image control device 100 is disposed at the lower end of the windshield 100 of the vehicle 700.

Figure 2B:
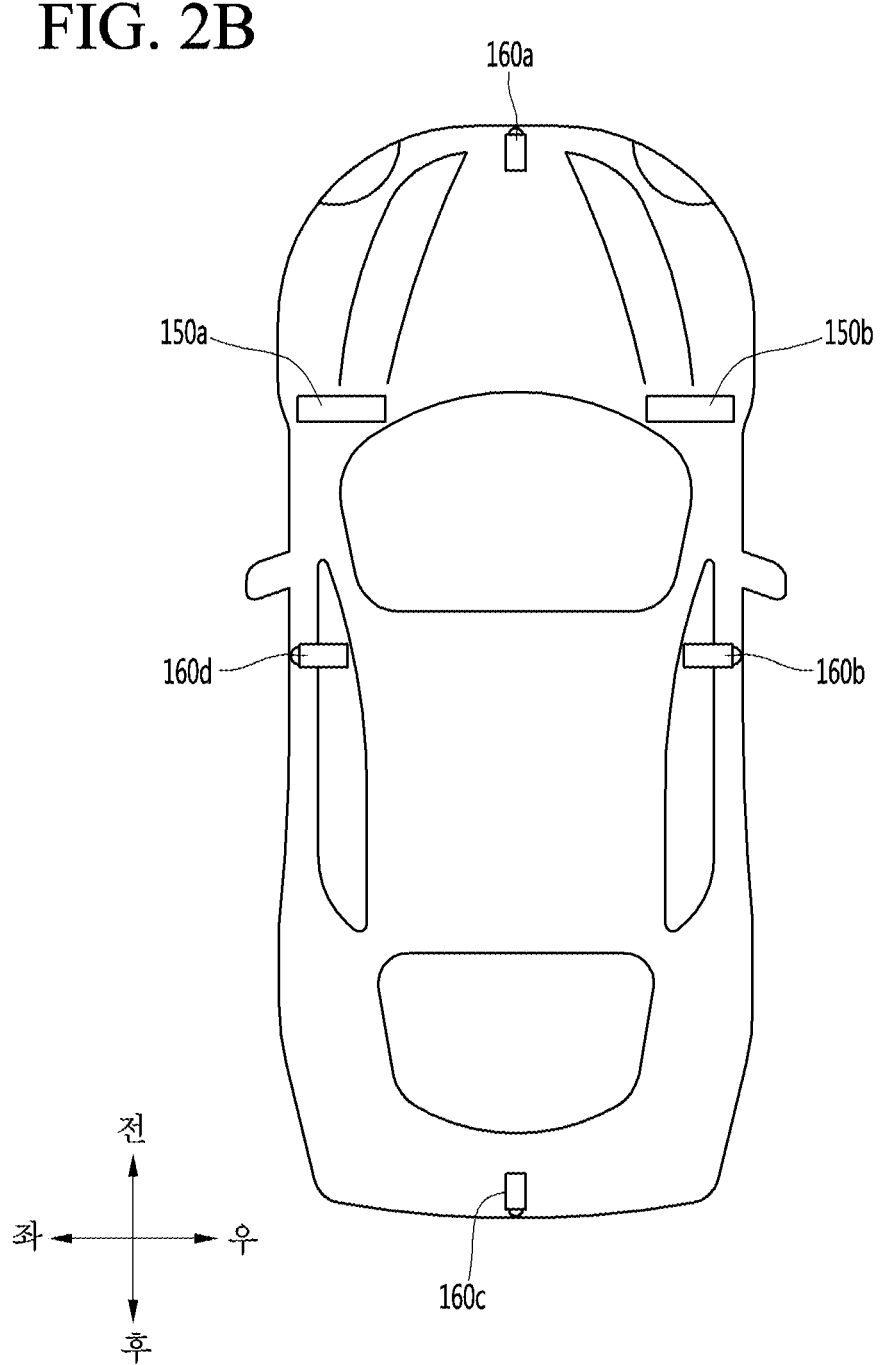
FIG. 2b is a view showing a state in which a sensor unit included in an around-view image control device according to an embodiment is disposed in a vehicle.

FIG. 2b is a view showing a state in which a sensor unit included in an around-view image control device according to an embodiment is disposed in a vehicle.

A distance sensor 150 included in the sensing unit 155 may be disposed at at least one of front, rear, left or right side or ceiling of the vehicle body. Referring to FIG. 2b, the distance sensors 150a and 150b are disposed at the left side and the right side of the vehicle.

A camera 160 included in the sensing unit 155 may be provided at various positions to monitor the front, rear, left and right sides of a driving direction. Referring to FIG. 2b, cameras 160a, 160b, 160c and 160d are disposed at the front, rear, left and right sides of the vehicle, respectively.

For example, the camera 160a installed at the front side of the vehicle is referred to as a first camera, the camera 160b installed at the right side of the vehicle is referred to as a second camera, the camera 160c installed at the rear side of the vehicle is referred to as a third camera, and the camera 106d installed at the left side of the vehicle is referred to as a fourth camera, without being limited thereto. Among the plurality of cameras 160a, 160b, 160c and 160d, a first described camera may be referred to as a first camera and a subsequently described camera may be referred to as a second camera.

The first camera 160a may acquire a front image, by capturing the image of the front side in the driving direction. To this end, the first camera 160a may be disposed near an emblem or a radiator grille.

The second camera 160b may be disposed in a case surrounding a right side-view mirror. In some embodiments, the second camera 160b may be disposed outside the case surrounding the right side-view mirror or may be disposed in one region outside a right front door, a right rear door or a right fender.

The third camera 160c may acquire a rear image by capturing the image of the rear side in the driving direction. The third camera 160c may be disposed near a rear license plate or a trunk switch.

The fourth camera 160d may be disposed in a case surrounding a left side-view mirror. In some embodiments, the fourth camera 160d may be disposed outside the case surrounding the left side-view mirror or may be disposed in one region outside a left front door, a left rear door or a left fender.

Although not shown, a camera may be additionally installed on the ceiling of the vehicle. The ceiling camera may capture all the front, rear, left and right sides of the vehicle.

In addition, if necessary, cameras may be further installed in addition to the first to fourth cameras 160a, 160b, 160c and 160d.

Figure 3:
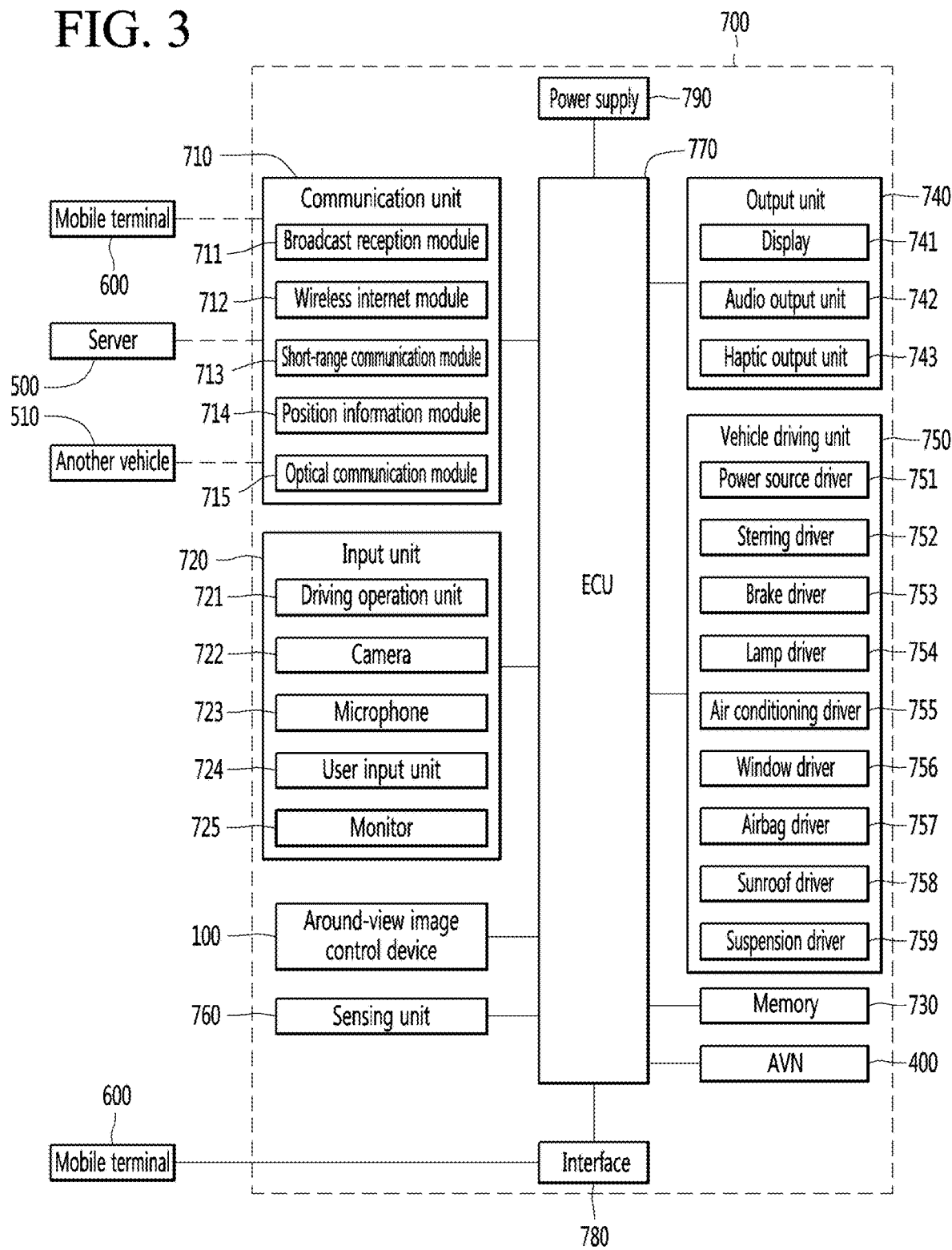
FIG. 3 is a block diagram showing the configuration of a vehicle including an around-view image control device according to an embodiment.

FIG. 3 is a block diagram showing the configuration of a vehicle including an around-view image control device according to an embodiment.

The around-view image control device 100 according to the embodiment may be installed inside the vehicle 700.

Referring to FIG. 3, the vehicle 700 may include a communication unit 710, an input unit 720, a sensing unit 760, an output unit 740, a vehicle driving unit 750, a memory 730, an AVN device 400, an interface 780, an ECU 770, a power supply 790 and an around-view image control device 100.

The communication unit 710 may include one or more modules for enabling wireless communication between the vehicle 700 and the mobile terminal 600, between the vehicle 700 and an external server 500 or between the vehicle 700 and another vehicle 510. In addition, the communication unit 710 may include one or more modules for connecting the vehicle 700 to one or more networks.

The communication unit 710 may include a broadcast reception module 711, a wireless Internet module 712, a short-range communication module 713, a position information module 714 and an optical communication module 715.

The broadcast reception module 711 receives a broadcast signal or broadcast related information from an external broadcast management server through a broadcast channel. Here, the broadcast includes a radio broadcast or a TV broadcast.

The wireless Internet module 712 refers to a module for wireless Internet access and may be installed inside or outside the vehicle 700. The wireless Internet module 712 is configured to transmit and receive a wireless signal through a communication network according to wireless Internet technologies.

Wireless Internet technologies include, for example, WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced), etc., and the wireless Internet module 712 transmits and receives data according to at least one wireless Internet technology in a range including Internet technologies not listed above. For example, the wireless Internet module 712 may exchange data with the external server 500 wirelessly. The wireless Internet module 712 may receive weather information or road traffic status information (e.g., TPEG (Transport Protocol Expert Group)) from the external server 500.

The short-range communication module refers to a module for short range communication, and may support short range communication using Bluetooth™, RFID (Radio Frequency Identification), Infrared Data Association (IrDA), UWB (Ultra Wideband), ZigBee, NFC (Near Field Communication), Wi-Fi (Wireless-Fidelity), Wi-Fi Direct, or wireless USB (Wireless Universal Serial Bus) technology.

The short-range communication module 713 may establish wireless area networks and perform short range communication between a vehicle and at least one external device. For example, the short-range communication module 713 may exchange data with the mobile terminal 600 wirelessly. The short-range communication module 713 may receive weather information or road traffic status information (e.g., TPEG (Transport Protocol Expert Group)) from the mobile terminal 600. When a user gets into the vehicle, the mobile terminal 600 of the user and the vehicle may pair with each other automatically or by execution of an application by the user.

The position information module 714 refers to a module for acquiring the position of the vehicle, and a representative example thereof includes a GPS (Global Positioning System) module. For example, the vehicle 700 may acquire the position of the vehicle 700 based on a signal received from a GPS satellite using the GPS module.

The optical communication module 715 may include a light transmission unit and a light reception unit.

The light reception unit may convert a light signal into an electrical signal and receive information. The light reception unit may include a photo diode (PD) for receiving light. The photo diode may convert light into an electrical signal. For example, the light reception unit may receive information on a preceding vehicle through light emitted from a light source included in the preceding vehicle.

The light transmission unit may include at least one light emitting element for converting an electrical signal into a light signal. Here, the light emitting element is preferably a light emitting diode (LED). The light transmission unit converts the electrical signal into a light signal and emit the light signal to the outside. For example, the light transmission unit may emit the light signal to the outside through blinking of the light emitting element corresponding to a predetermined frequency. In some embodiments, the light transmission unit may include a plurality of light emitting element arrays. In some embodiments, the light transmission unit may be integrated with a lamp provided in the vehicle. For example, the light transmission unit may be at least one of a headlight, a taillight, a brake light, a turn signal, and a vehicle width lamp.

According to one embodiment, the optical communication module 715 may exchange data with another vehicle 510 through optical communication.

The input unit 720 may include a driving operation unit 721, a camera 722, a microphone 723, a user input unit 724 and a monitor 725.

The driving operation unit 721 receives user input for driving the vehicle. The driving operation unit 721 may include a steering input unit, a shift input unit, an acceleration input unit, a brake input unit, etc.

The steering input unit receives input of the direction of traveling of the vehicle 700. The steering input unit may be formed in the form of a wheel to enable steering input by rotation. In some embodiments, the steering input unit may be formed as a touchscreen, a touch pad or a button.

The shift input unit receives input for park P, drive D, neural N and reverse R of the vehicle. The shift input unit may be formed in the form of a lever. In some embodiments, the shift input unit may be formed as a touchscreen, a touch pad or a button.

The acceleration input unit receives input for acceleration of the vehicle. The brake input unit receives input for deceleration of the vehicle. In this case, the acceleration input unit and the brake input unit may be formed in the form of a pedal. In some embodiments, the acceleration input unit and the brake input unit may be formed as a touchscreen, a touch pad or a button.

The camera 722 may include an image sensor and an image processing module. The camera 722 may process a still image or a moving image obtained by the image sensor (e.g., CMOS or CCD). The image processing module may extract necessary information by processing the still image or the moving image acquired through the image sensor, and transmit the extracted information to the ECU 770. Meanwhile, the vehicle 700 may include the camera 722 for capturing the front image of the vehicle or the surrounding image of the vehicle and the monitor 725 for capturing the interior image of the vehicle.

The monitor 725 may acquire the image of a passenger. The monitor 725 may acquire an image for biometrics of the passenger.

Although the monitor 725 and the camera 722 are shown as being included in the input unit 720 in FIG. 3, the camera 722 may be included in the around-view image control device 100 as described above.

The microphone 723 may process an external audio signal into electrical data. The processed data may be variously used according to the function performed by the vehicle 700.

The microphone 723 may convert a user's voice command into electrical data. The converted electrical data may be transmitted to the ECU 770.

The user input unit 724 may receive information from the user. When information is received through the user input unit 724, the ECU 770 may control operation of the vehicle 700 to correspond to input information. The user input unit 724 may include a touch input unit or a mechanical input unit. In some embodiments, the user input unit 724 may be disposed in one region of a steering wheel. In this case, a driver may manipulate the user input unit 724 with their finger in a state of holding the steering wheel.

The sensing unit 760 senses a signal related to driving of the vehicle. To this end, the sensing unit 760 may include a collision sensor, a wheel sensor, a speed sensor, a tilt sensor, a weight sensor, a heading sensor, a yaw sensor, a gyro sensor, and a position module, a vehicle forward/reverse sensor, a battery sensor, a fuel sensor, a tire sensor, a steering sensor by rotation of the steering wheel, a vehicle interior temperature sensor, a vehicle interior humidity sensor, an ultrasonic sensor, a radar, a LiDar, and the like.

Accordingly, the sensing unit 760 may acquire vehicle collision information, vehicle direction information, vehicle position information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, steering wheel rotation angle, and the like.

Meanwhile, the sensing unit 760 may further include an accelerator pedal sensor, a pressure sensor, an engine speed sensor, an Air Flow Sensor (AFS), an Air Temperature Sensor (ATS), a Water Temperature Sensor (WTS), a Throttle Position Sensor (TPS), a Top Dead Center (TDC) sensor, a Crank Angle Sensor (CAS), and so on.

The sensing unit 760 may include a biometric information sensing unit. The biometric information sensing unit detects and acquires the biometric information of the passenger. The biometric information may include fingerprint information, iris-scan information, retina-scan information, hand geometry information, facial recognition information, and voice recognition information. The biometric information sensing unit may include a sensor for sensing biometric information of the passenger. Here, the monitor 725 and the microphone 723 may operate as sensors. The biometric information sensing unit may acquire hand shape information and facial recognition information through the monitor 725.

The output unit 740 refers to a component for outputting the information processed by the ECU 770 and may include a display 741, an audio output unit 742 and a haptic output unit 743.

The display 741 may display the information processed by the ECU 770. For example, the display 741 may display vehicle related information. Here, the vehicle related information may include vehicle control information for direct control of the vehicle or vehicle driving assistance information for guiding driving to the driver of the vehicle. In addition, the vehicle related information may include vehicle status information indicating the current status of the vehicle or vehicle driving information related to driving of the vehicle.

The display 741 may be the display 180 of the around-view image control device 100 or may be provided separately from the display 180.

The display 741 may be implemented by at least one of a liquid crystal display (LCD), a thin film transistor-liquid crystal display (TFT LCD), an organic light-emitting diode (OLED), a flexible display, a three-dimensional (3D) display, or an e-ink display.

The display 741 may implement a touchscreen by forming an interlayer structure with or being formed integrally with a touch sensor. Such a touchscreen may function as the user input unit 724 for providing an input interface between the vehicle 700 and the user and provide an output interface between the vehicle 700 and the user. In this case, the display 741 may include a touch sensor for detecting touch of the display 741 to receive a control command by a touch method. When the display 741 is touched, the touch sensor may be configured to detect the touch and the ECU 7700 may be configured to generate a control command corresponding to the touch. Content input by the touch method is characters or numbers or menu items which may be indicated or designated in various modes.

The display 741 may include a cluster such that the driver checks vehicle status information or vehicle driving information while driving. The cluster may be located on a dashboard. In this case, the driver may check information displayed on the cluster while keeping an eye on the front side of the vehicle.

In some embodiments, the display 741 may be implemented as a Head Up Display (HUD). When the display 741 is implemented as a HUD, information may be output through a transparent display provided in the windshield. Alternatively, the display 741 may include a projection module to output information through an image projected onto the windshield.

The audio output unit 742 converts the electrical signal from the ECU 770 into an audio signal and outputs the audio signal. To this end, the audio output unit 742 may include a speaker, etc. The audio output unit 742 may output sound corresponding to operation input by the user input unit 724.

The haptic output unit 743 generates tactile output. For example, the haptic output unit 743 may vibrate a steering wheel, a seat belt or a seat to allow the user to recognize the output.

The vehicle driving unit 750 may control operations of various devices and components included in the vehicle 700. The vehicle driving unit 750 may include a power source driver 751, a steering driver 752, a brake driver 753, a lamp driver 754, an air conditioning driver 755, a window driver 756, an airbag driver 757, a sunroof driver 758 and a suspension driver 759.

The power source driver 751 may perform electronic control of the power source in the vehicle 700.

For example, when a fossil fuel based engine (not shown) is a power source, the power source driver 751 may perform electronic control of the engine. Therefore, it is possible to control the output torque of the engine. When the power source driver 751 is an engine, the speed of the vehicle may be limited by limiting the engine output torque under control of the ECU 770.

As another example, when an electric motor (not shown) is a power source, the power source driver 751 may perform control of the motor. Therefore, it is possible to control the rotation speed, torque, etc. of the motor.

The steering driver 762 may perform electronic control of a steering apparatus in the vehicle. Therefore, it is possible to change the direction of traveling of the vehicle.

The brake driver 753 may perform electronic control of a brake apparatus (not shown) in the vehicle. For example, it is possible to reduce the speed of the vehicle by controlling operation of the brake disposed in the wheel. As another example, it is possible to control the direction of traveling of the vehicle to the left or the right, by differentiating operation of the brakes respectively disposed in a left wheel and a right wheel.

The lamp driver 754 may control on/off of lamps disposed inside and outside the vehicle. In addition, it is possible to control the intensity, direction, etc. of light of the lamp. For example, it is possible to control a turn signal lamp, a brake lamp, etc.

The air conditioning driver 755 may perform electronic control of an air conditioner (not shown) in the vehicle. For example, when the interior temperature of the vehicle is high, the air conditioner may operate such that cool air is supplied into the vehicle 700.

The window driver 756 may perform electronic control of a window apparatus in the vehicle. For example, it is possible to control opening or closing of left and right windows of the vehicle 700.

The airbag driver 757 may perform electronic control of an airbag apparatus in the vehicle. For example, when an accident occurs, an airbag may be controlled to burst.

The sunroof driver 758 may perform electronic control of a sunroof apparatus (not shown) in the vehicle. For example, it is possible to control opening or closing of a sunroof.

The suspension driver 759 may perform electronic control of a suspension apparatus (not shown) in the vehicle 700. For example, when a road surface is uneven, the suspension apparatus may be controlled to reduce vibration of the vehicle.

The memory 730 is electrically connected with the ECU 770. The memory 730 may store basic data of a unit, control data for operation control of the unit, and input/output data. The memory 730 may include various storage media such as a ROM, a RAM, an EPROM, a flash drive, a hard drive, etc. in hardware. The memory 730 may store a variety of data for overall operation of the vehicle, such as programs for processing or control of the ECU 770.

The interface 780 may serve as a path to various types of external devices connected to the vehicle 700. For example, the interface 780 may include a port connectable to the mobile terminal 600 and may be connected with the mobile terminal 600 through the port. In this case, the interface 780 may exchange data with the mobile terminal 600.

The interface 780 may serve as a path for supplying electric energy to the connected mobile terminal 600. When the mobile terminal 600 is directly connected to the interface 780, the interface 780 provides electric energy supplied by the power supply 790 to the mobile terminal 600, under control of the ECU 770.

The ECU 770 may control overall operation of the components in the vehicle 700. The ECU 770 may also be referred to as an ECU Electronic Control Unit).

According to transmission of an execution signal of the around-view image control device 100, the ECU 770 may perform a function corresponding to the transmitted signal.

The ECU 770 may be implemented in the form of at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, or electrical units for performing the other functions in hardware.

At this time, the controller or the microprocessor may be provided separately with the processor 170 included in the around-view image control device 100.

The power supply 790 may supply power necessary for operation of the components, under control of the ECU 770.

In this case, the power supply 790 may receive power from a battery (not shown) in the vehicle.

An AVN (Audio Video Navigation) device 400 may exchange data with the ECU 770. The ECU 770 may receive navigation information from the AVN device 400 or a separate navigation device (not shown). Here, the navigation information may include set destination information, route information according to the destination, map information related to vehicle driving or vehicle position information.

Figure 4:
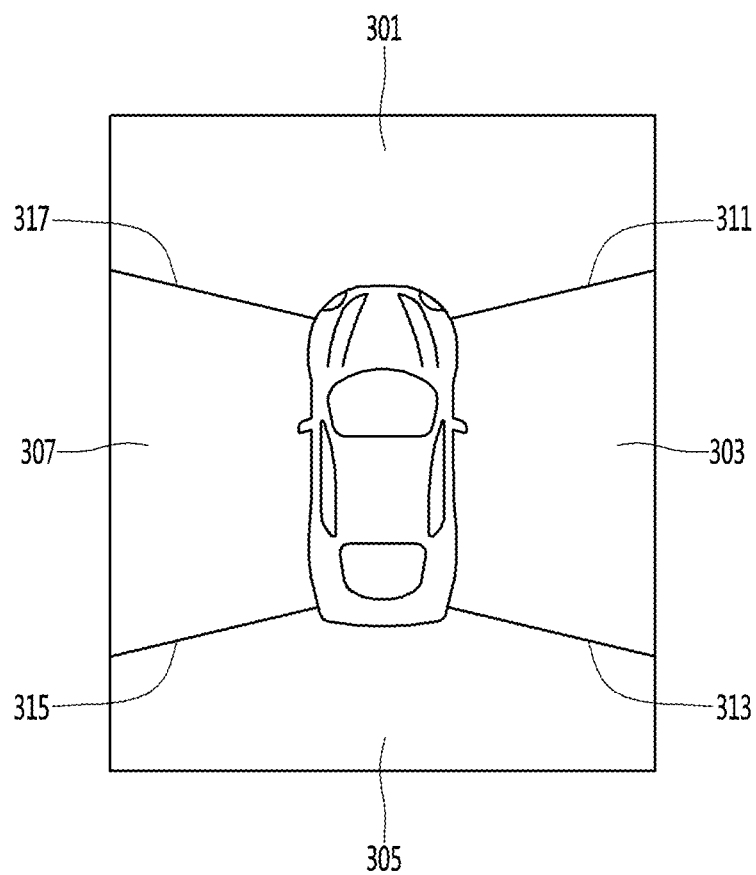
FIG. 4 is a view showing an around-view image.

FIG. 4 is a view showing an around-view image.

Referring to FIG. 4, the around-view image may include first to fourth synthesis regions 301, 303, 305 and 307. Such an around-view image may be displayed on the display 180.

The first synthesis region 301 may be generated based on a front image acquired by the first camera 160*a* installed on the front side of the vehicle 700. The second synthesis region 303 may be generated based on a right image acquired by the second camera 160*b* installed on the right side of the vehicle 700. The third synthesis region 305 may be generated based on a rear image acquired by the third camera 160*c* installed on the rear side of the vehicle 700. The fourth synthesis region 307 may be generated based on a left image acquired by the fourth camera 160*d* installed on the left side of the vehicle 700.

The images of the synthesis regions 301, 303, 305 and 307 may be different from the images acquired by the first to fourth cameras 160*a*, 160*b*, 160*c* and 160*d*.

That is, the images acquired by the first to fourth cameras 160*a*, 160*b*, 160*c* and 160*d* may be received through the lenses of the cameras 160*a*, 160*b*, 160*c* and 160*d* and thus the actual shape of an object may be displayed as an image without change. In contrast, the image of each of the synthesis regions 301, 303, 305 and 307 may be an image obtained by changing the front view of each of the images acquired by the first to fourth cameras 160*a*, 160*b*, 160*c* and 160*d* to a top view.

For example, if the object of the image acquired by a specific camera of the first to fourth cameras 160*a*, 160*b*, 160*c* and 160*d* is a standing person, the person who is the object of the synthesis region generated from the acquired image may be shown as being not standing but being lying down.

The first to fourth synthesis regions 301, 303, 305 and 307 may be disposed adjacent to each other with border lines 311, 313, 315 and 317 interposed therebetween. For example, the first synthesis region 301 and the second synthesis region 303 may be disposed adjacent to each other with the first border line 311 interposed therebetween. The second synthesis region 303 and the third synthesis region 305 may be disposed adjacent to each other with the second border line 313 interposed therebetween. The third synthesis region 305 and the fourth synthesis region 307 may be disposed adjacent to each other with the third border line 315 interposed therebetween. The fourth synthesis region 307 and the first synthesis region 301 may be disposed adjacent to each other with the fourth border line 317 interposed therebetween.

The around-view image may be generated based on synthesis information stored in the memory 140. As described above, the range information of the first to fourth synthesis regions 307 generated from the images of the first to fourth cameras 160*a*, 160*b*, 160*c* and 160*d* and the border line information of the borders of the first to fourth synthesis information may be stored in the memory 140 as the synthesis information.

The border line information may be set to the positions of the first to fourth border lines 311, 313, 315 and 317. The range information of the synthesis regions may be set to the ranges of the synthesis regions 301, 303, 305 and 307.

Accordingly, the processor 170 may generate the synthesis regions 301, 303, 305 and 307 from the images acquired from the first to fourth cameras 160*a*, 160*b*, 160*c* and 160*d* based on the range information of the synthesis information and the border line information and synthesize the synthesis regions 301, 303, 305 and 307, thereby generating the around-view image.

The generated around-view image may be displayed on the display 180 without change in a normal mode.

Specifically, the processor 170 may extract images corresponding to regions between the border lines 311, 313, 315 and 317 from the images acquired from the first to fourth cameras 160*a*, 160*b*, 160*c* and 160*d* based on the range information of the synthesis region set in the border line information and the border line information, and generate the around-view image including the first to fourth synthesis regions 301, 303, 305 and 307 based on the extracted images.

As described above, the images acquired from the first to fourth cameras 160*a*, 160*b*, 160*c* and 160*d* and the first to fourth synthesis regions 301, 303, 305 and 307 from the images are different.

Figure 5:
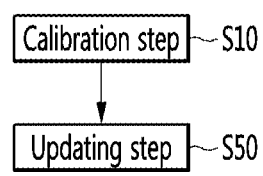
FIG. 5 is a flowchart illustrating an around-view image calibration method of an around-view image control device according to an embodiment.

FIG. 5 is a flowchart illustrating an around-view image calibration method of an around-view image control device according to an embodiment. The calibration method may be a correction method. Referring to FIG. 5, when a correction event occurs, correction may be performed (S10) and update may be performed (S50) after correction is completed.

In the correction step S10, correction may be performed in order to solve mismatching between the synthesis regions 301, 303, 305 and 307.

Figure 6A:
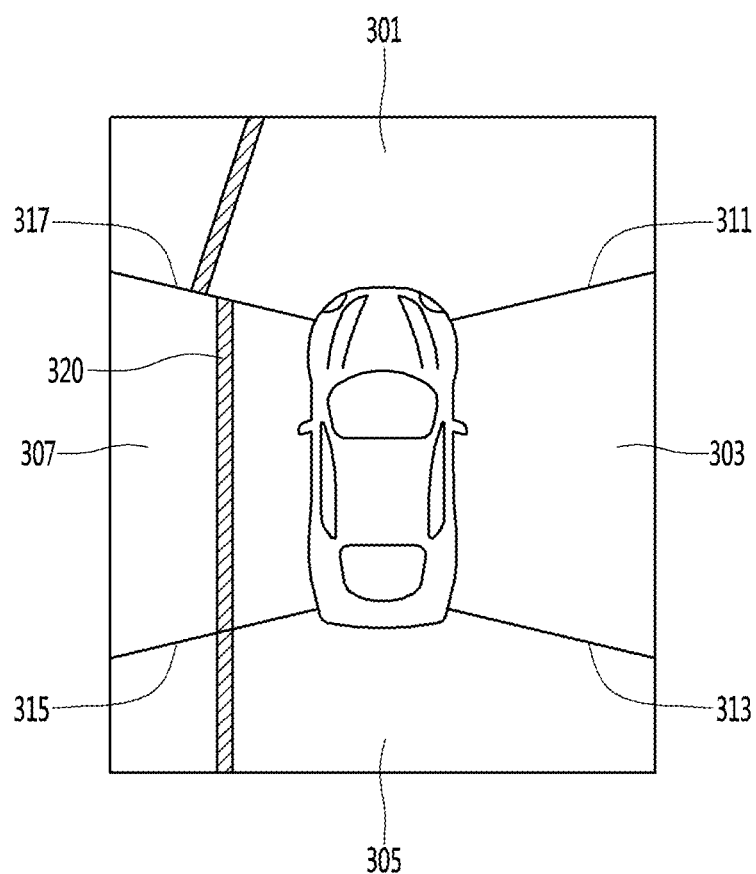
FIGS. 6a-6b are views showing a state of correcting image mismatching.

As shown in FIG. 6*a*, a guide bar 320 having a straight-line shape may be located on the left side of a road. The guide bar 320 may be the line of the road. In the case where the first camera 160*a* has a problem to cause mismatching between the synthesis regions 301, 303, 305 and 307, when a vehicle travels along this guide bar, the guide bar 320 may be distorted in the border lines 311, 313, 315 and 317 between the first synthesis region 301 and the second synthesis region 303 or the first synthesis region 301 and the fourth synthesis region 307 obtained by synthesizing the images acquired from the cameras 160*a*, 160*b*, 160*c* and 160*d*.

Figure 6B:
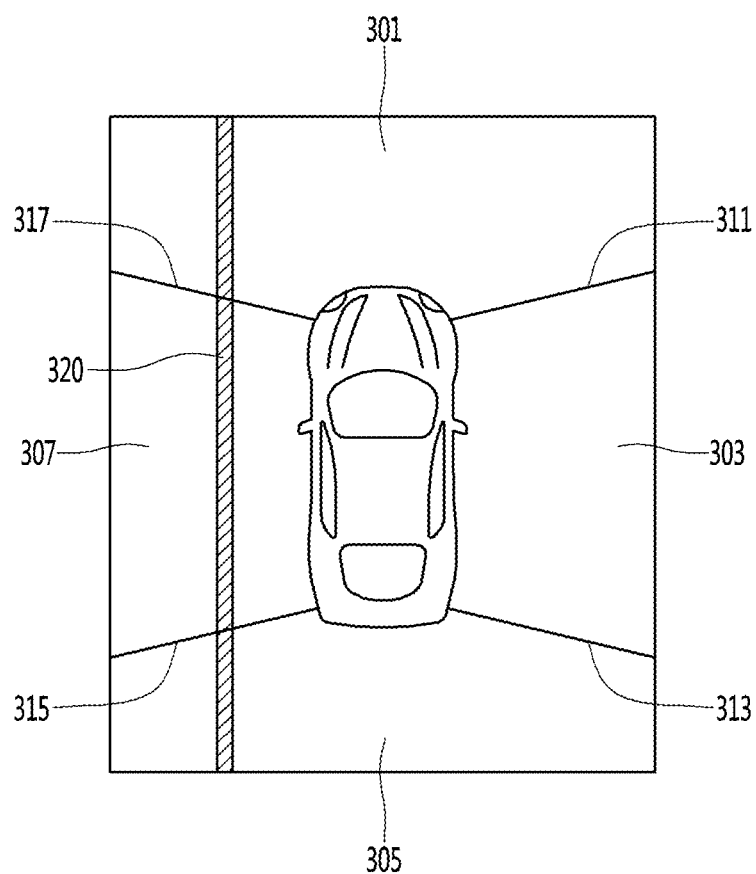

In this case, in the correction step S10, the first synthesis region 301 may be corrected and, as shown in FIG. 6*b*, the first synthesis region 301 and the fourth synthesis region 307 may match and the guide bar 320 between the first synthesis region 301 and the fourth synthesis region 307 may be viewed as a straight line.

In the updating step S50, the around-view image may be updated based on correction information which is a result of correcting mismatching.

Hereinafter, the correction step S10 will be described in detail.

Figure 7:
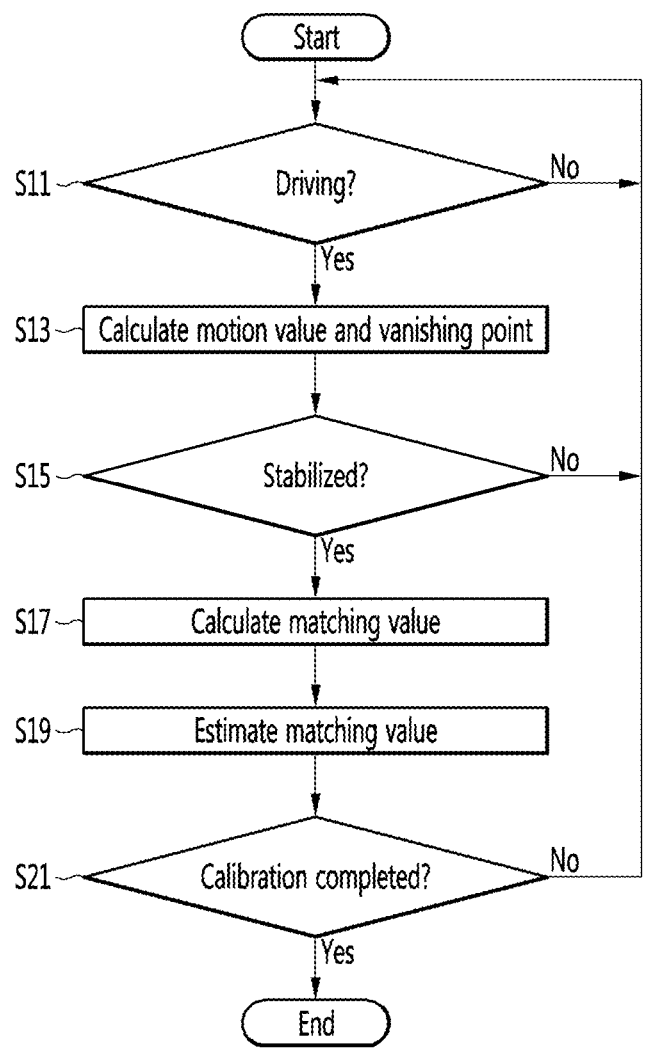
FIG. 7 is a flowchart illustrating a method of estimating a matching value for correction in an around-view image control device according to an embodiment.

FIG. 7 is a flowchart illustrating a method of estimating a matching value for correction in an around-view image control device according to an embodiment.

Referring to FIGS. 1 and 7, the processor 170 may determine whether the vehicle is traveling using CAN communication with the ECU 770 (S11). The ECU 770 may receive sensor signals from various sensors, and, more particularly, a wheel rotation sensor, and determine whether the vehicle is traveling based on the sensor signals. The result of determination may be transmitted to the processor 170 using CAN communication.

When the vehicle starts to be driven, the processor 170 may calculate a motion value and a vanishing point (S13).

Specifically, when the vehicle starts to be driven, the processor 170 may control the first to fourth cameras 160a, 160b, 160c and 160d to acquire first to fourth images from the first to fourth cameras 160a, 160b, 160c and 160d. The processor 170 may convert the acquired first to fourth image using a polar coordinate system and generate first to fourth converted images. The first to fourth converted images may be the first to fourth synthesis regions 301, 303, 305 and 307 shown in FIG. 4, without being limited thereto. The processor 170 may calculate motion values and vanishing points in first to fourth synthesis regions 301, 303, 305 and 307 based on the first to fourth converted images.

For example, the first region may be covered by the first camera 160a, and the second region may be covered by the second camera 160b. The third region may be covered by the third camera 160c, and the fourth region may be covered by the fourth camera 160d.

For example, when the first to fourth images are converted using the polar coordinate system, the images may be converted into image signals which is viewed as if the ground is viewed from the top.

The motion value may be calculated based on change in image information between frames for each of the first to fourth converted images. The motion value may be calculated for each of the first to fourth converted images.

The vanishing point is a point which varies according to the ground state during driving, and may be a point, on which edge lines in the form of lines detected from the ground converge in each of the first to fourth converted images. Such a vanishing point may be calculated using a known calculation method. Such a vanishing point may be calculated for each of the first to fourth converted images.

As shown in FIGS. 8a to 8d, the vanishing point may be viewed in each of the first to fourth converted images acquired and converted from each of the first to fourth regions. The position of such a vanishing point may be changed according to the ground state. For example, when the ground state is flat, the vanishing point may be located at the center of the converted image. For example, when the ground state is uneven, the vanishing point may be located on the left or right side of the converted image, instead of the center of the converted image.

In particular, in the case of an unpaved road where the ground is not flat, since the position of the vanishing point is severely changed, it is difficult to stabilize the vanishing point. Accordingly, for correction, the vehicle is preferably driven on a paved road having the flat ground.

Figure 8A:
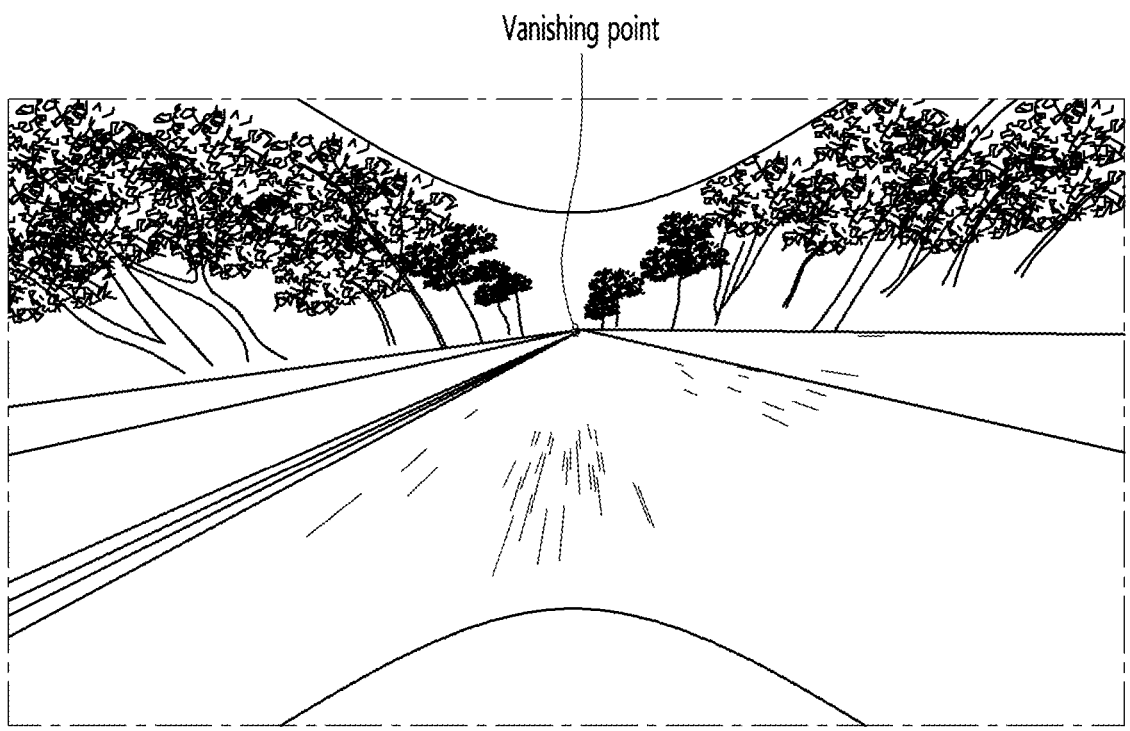
FIGS. 8a-8d are views showing change in vanishing point.

As shown in FIG. 8a, since the ground state is flat in a first converted image obtained by acquiring an image from a first region, that is, the front side of the road, and converting the image, the vanishing point may be located at the center of the first converted image.

Figure 8B:
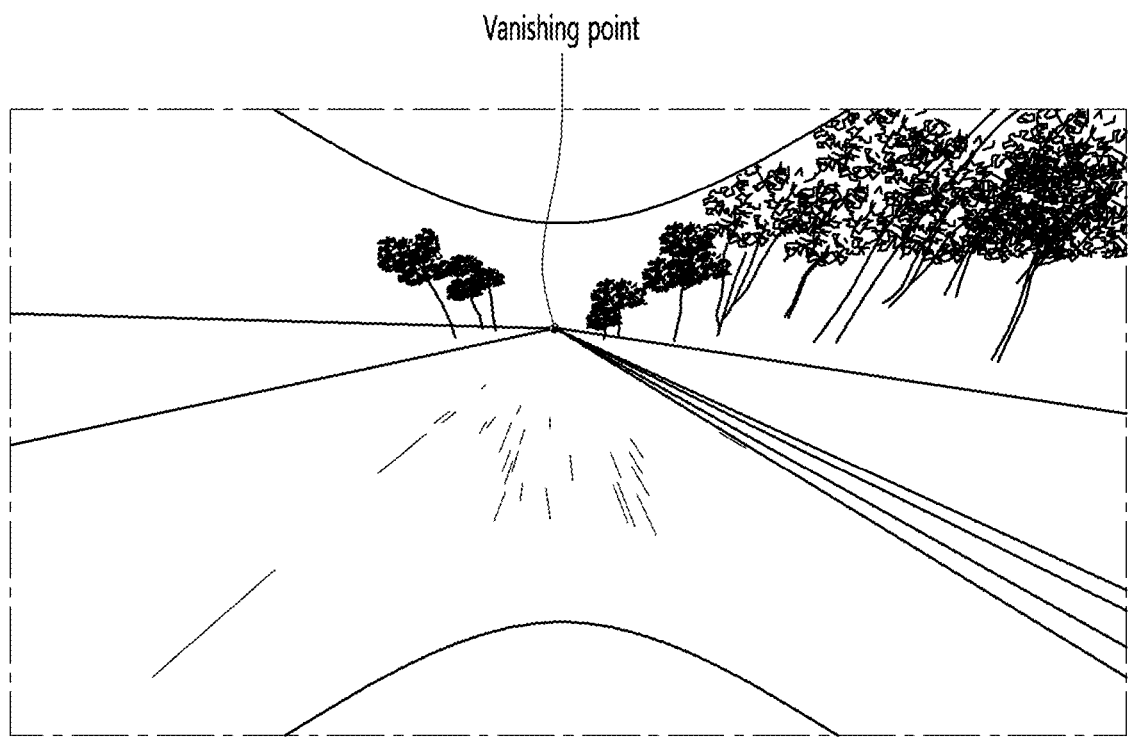

As shown in FIG. 8b, since the ground state is flat in a second converted image obtained by acquiring an image from a second region, that is, the rear side of the road, and converting the image, the vanishing point may be located at the center of the second converted image.

Figure 8C:
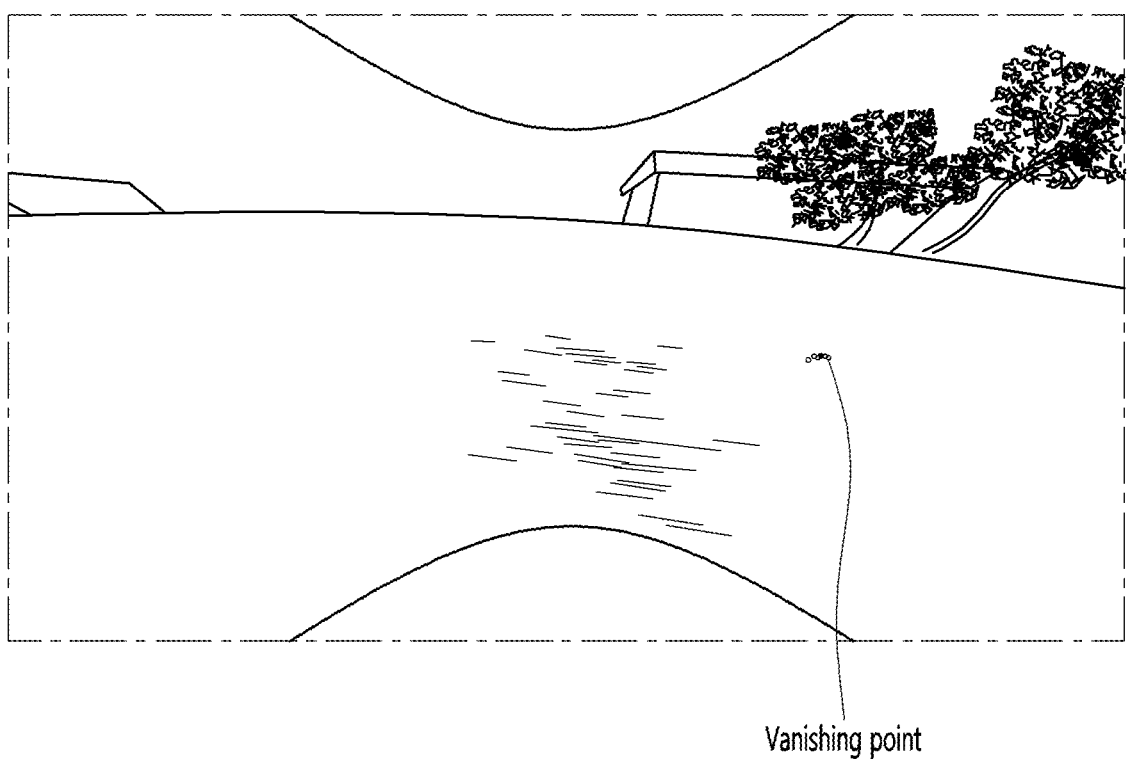
Figure 8D:
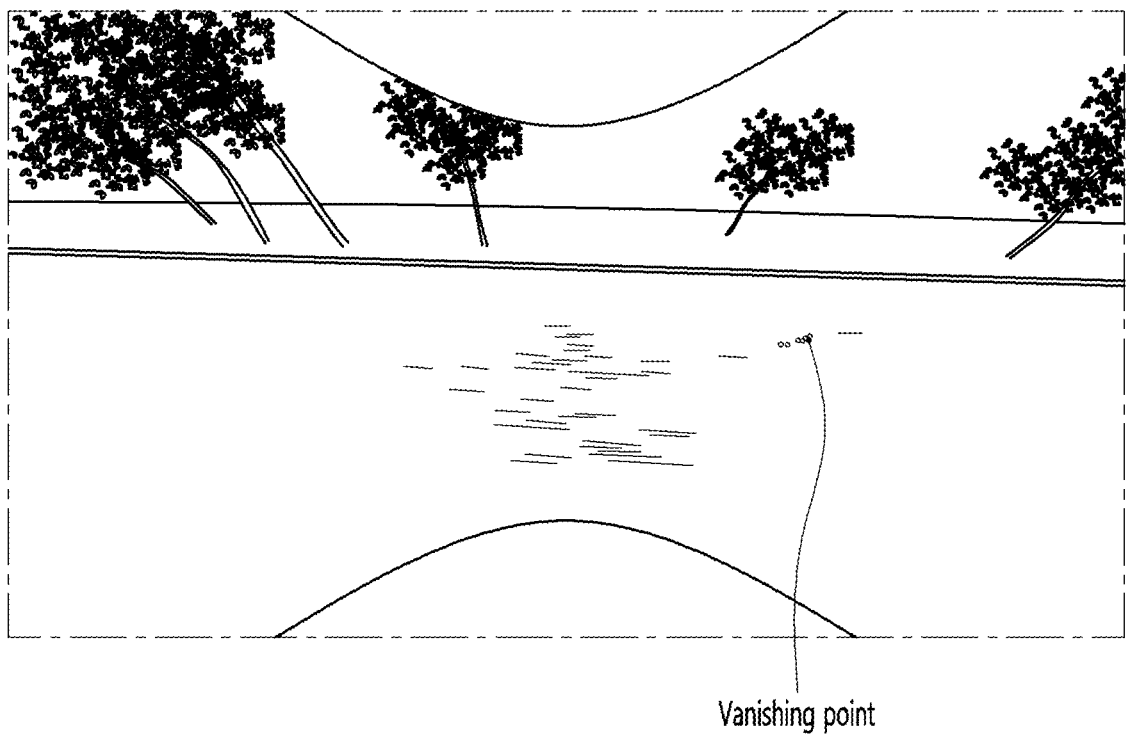

In FIGS. 8c and 8d, the vanishing points may deviate from the center in a third converted image obtained by acquiring an image from a third region, that is, the right side of the road, and a fourth converted image obtained by acquiring an image from a fourth region, that is, the left side of the road.

The processor 170 may determine whether the position change of the vanishing point is in a predetermined range based on the vanishing point, the position of which is changed according to the ground state, and determine stabilization of the vanishing point (S15). When the position change of the vanishing point is in the predetermined range, it may be determined that the vanishing point is stabilized. Stabilizing the vanishing point may mean that the ground is flat. When the ground is flat and the vanishing point is stabilized, correction may be accurately performed.

As another example, a given time may also be considered to determine stabilization of the vanishing point, in addition to the predetermined range. That is, when the position change of the vanishing point is in the predetermined range for a predetermined time, it may be determined that the vanishing point is stabilized.

When the vanishing point is stabilized, the processor 170 may calculate a matching value based on the calculated motion value after the vanishing point is stabilized (S17). The matching value may be an extrinsic parameter.

The extrinsic parameter may be calculated from three pieces of rotation angle information Yaw, Roll and Pitch and three pieces of axis information X, Y and Z. The three pieces of rotation angle information Yaw, Roll and Pitch and the three pieces of axis information X, Y and Z may be obtained based on the calculated motion value, and an extrinsic parameter, that is, a matching value, may be calculated based on the three pieces of rotation angle information Yaw, Roll and Pitch and the three pieces of axis information X, Y and Z. The matching value may be continuously obtained during a predetermined time.

The processor 170 may estimate an optimal matching value using a Gaussian model based on a plurality of continuously obtained matching values (S19).

Figure 9:
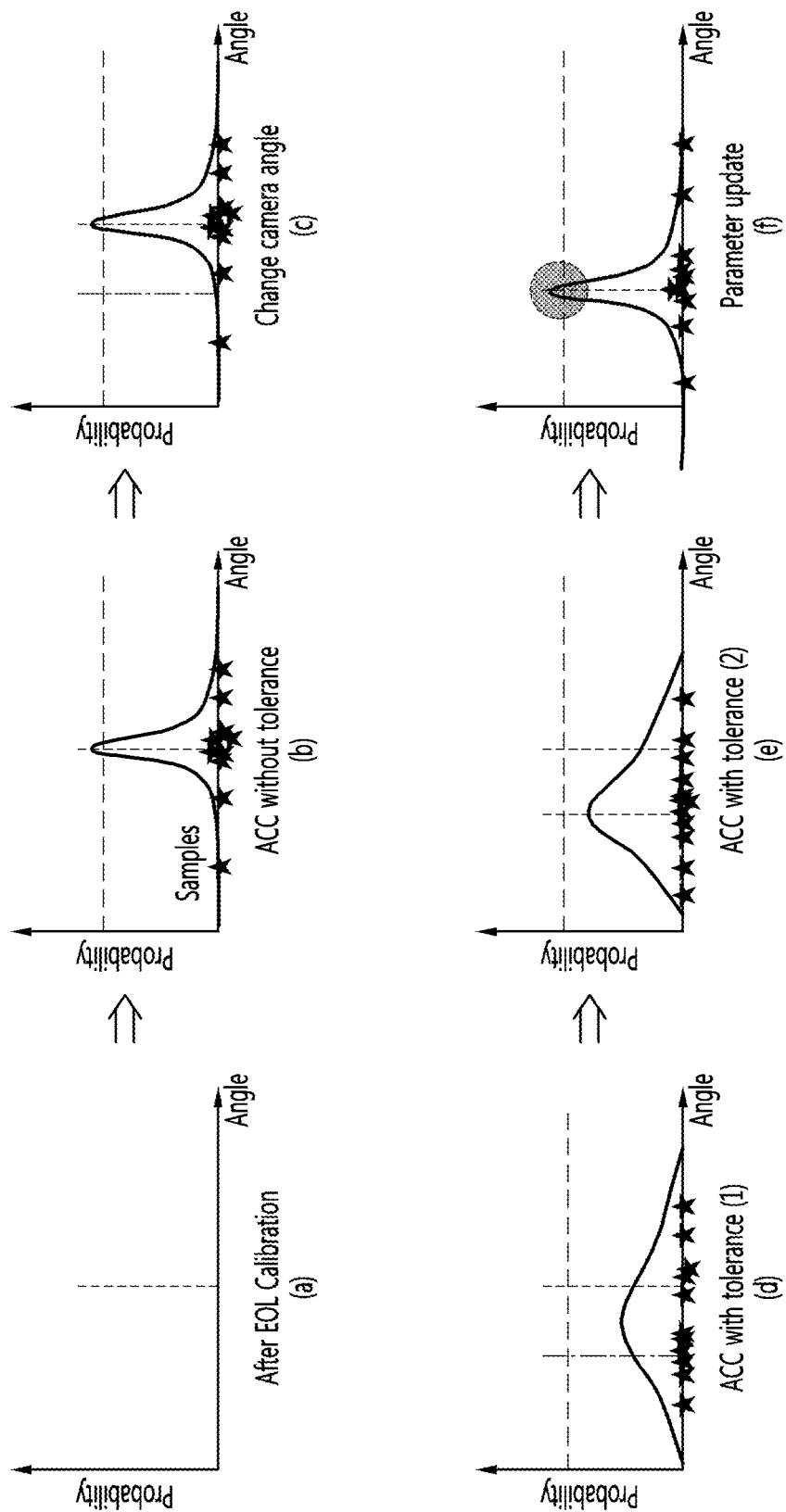
FIGS. 9a-9f are graphs illustrating a state of estimating a matching value.

When matching of a current image occurs and a first angle is set at this time as shown in FIG. 9a, the majority of matching values may converge on the set first angle as shown in FIG. 9b. Here, the angle may be an angle of the camera 160a, 160b, 160c or 160d or a viewpoint angle of the image.

As shown in FIG. 9c, image mismatching may occur by change in external environmental factors, and the angle at this time may be changed from the first angle to the second angle.

When image mismatching occurs, a matching value calculated from the converted image obtained from the cameras 160a, 160b, 160c and 160d through driving becomes different from a matching value when image matching occurs, and, as shown in FIGS. 9d and 9e, a newly changed matching value may probably converge on the second angle. Accordingly, as shown in FIG. 9f, an optimal matching value may be estimated through convergence of the matching values. Here, estimation may have the same meaning as decision. That is, the optimal matching value may be decided.

The processor 170 may determine whether correction is completed (S21). Completion of correction may mean that the optimal matching value is decided. That is, the processor 170 may determine that the optimal matching value is determined and move to S11 when the optimal matching value is not decided.

Here, the updating step S50 will be described in detail.

Figure 10:
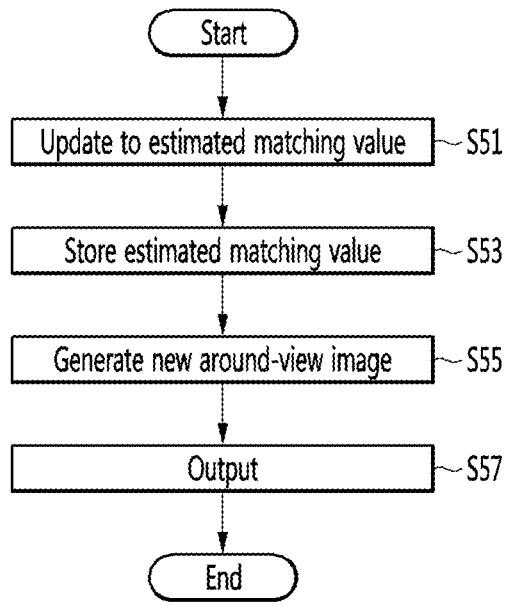
FIG. 10 is a flowchart illustrating a method of updating an around-view image in an around-view image control device according to a first embodiment.

FIG. 10 is a flowchart illustrating a method of updating an around-view image in an around-view image control device according to a first embodiment.

Referring to FIGS. 1, 7 and 10, the processor 170 may update a previous matching value to the estimated matching value (S51). The previous matching value may be stored in the memory 140.

The processor 170 may store the updated matching value in the memory 140 (S53). In this case, the previous matching value may be deleted from the memory 140.

As another example, the first and second regions may be allocated to the memory 140, the previous matching value may be stored in the first region, and the estimated matching value may be stored in the second region. In this case, the previous matching value may or may not be deleted from the memory 140. For convenience of description, although two regions are allocated to the memory 140, two or more regions may be allocated to the memory 140.

The processor 170 may generate a new around-view image based on the updated matching value (S55). The new around-view image may be stored in the memory 140. The new around-view image may be temporarily stored in the memory 140, and may be deleted from the memory 140 when being not selected by the driver as described below, without being limited thereto.

The previous around-view image generated by the previous matching value may be stored in the memory 140 without change or deleted from the memory 140 when the new around-view image is generated.

The processor 170 may output the new around-view image (S57). The new around-view image may be displayed on the display 180.

The processor 170 may display only the new around-view image or simultaneously display the previous around-view image and the new around-view image.

Figure 11:
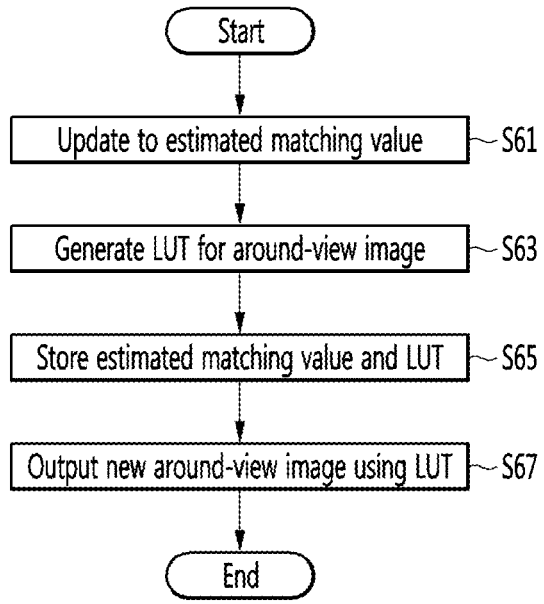
FIG. 11 is a flowchart illustrating a method of updating an around-view image in an around-view image control device according to a second embodiment.

FIG. 11 is a flowchart illustrating a method of updating an around-view image in an around-view image control device according to a second embodiment.

Referring to FIGS. 1, 7 and 11, the previous matching value may be updated to the estimated matching value (S61).

Instead of update, the previous matching value and the estimated matching value may be separately stored in the memory 140.

The processor 170 may generate a new lookup table LUT for the around-view image based on the updated matching value (S63).

The processor 170 may store the estimated matching value and the generated new lookup table in the memory 140 (S65). In addition, the previous matching value and the previous lookup table generated by the previous matching value may be stored in the memory 140, without being limited thereto.

The processor 170 may output or display the new around-view image using the new lookup table stored in the memory 140 (S67).

As another example, the first and second region may be allocated to the memory 140, the previous matching value and the previous lookup table may be stored in the first region, and the updated matching value and the new lookup table may be stored in the second region. In this case, the previous around-view image may be output or displayed using a first lookup table stored in the first region of the memory 140, and the new around-view image may be output or displayed using a second lookup table stored in the second region of the memory 140. The previous around-view image may be referred to as a first around-view image, and the new around-view image may be referred to as a second around-view image.

In summary, in the method of updating the around-view image according to the first embodiment, the previous matching value may be updated to the new matching value, the updated new matching value may be stored in the memory 140, and the new around-view image may be generated and output using the stored new matching value. Accordingly, according to the first embodiment, since only the matching value is stored in the memory 140, the capacity of the memory 140 may be small, and thus the size of the memory 140 may be reduced.

In contrast, in the method of updating the around-view image according to the second embodiment, the previous matching value may be updated to the new matching value, a new lookup table may be generated using the updated matching value, the generated new lookup table may be stored in the memory 140, and the new around-view image may be generated and output using the stored new lookup table. Accordingly, according to the second embodiment, since the new around-view image is immediately output using the new lookup table, the processing burden of the processor 170 can be reduced.

Hereinafter, a correction method when image mismatching occurs by change in external environmental factors will be described in detail.

Figure 12:
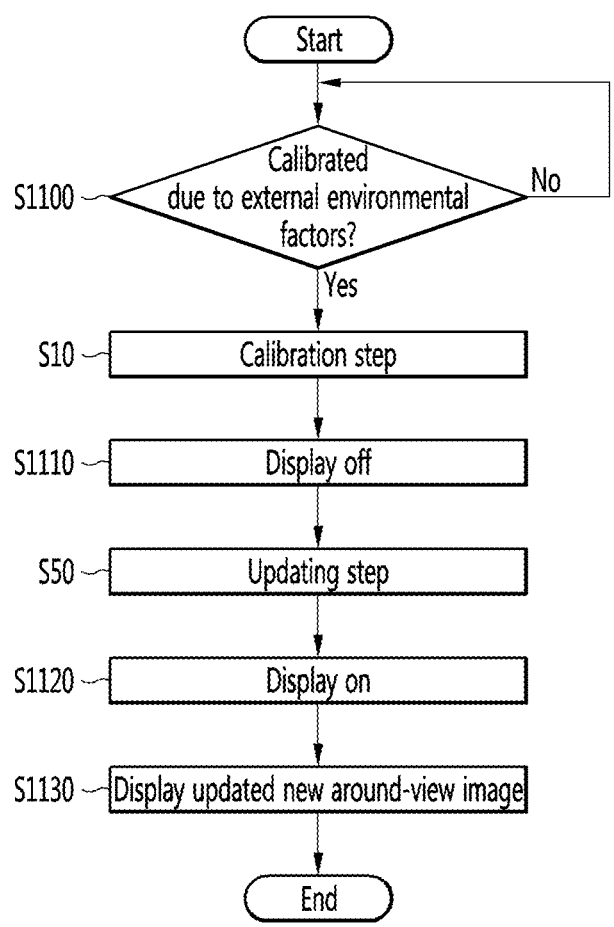
FIG. 12 is a flowchart illustrating a correction method when image mismatching occurs due to change in external environmental factors.
Figure 13:
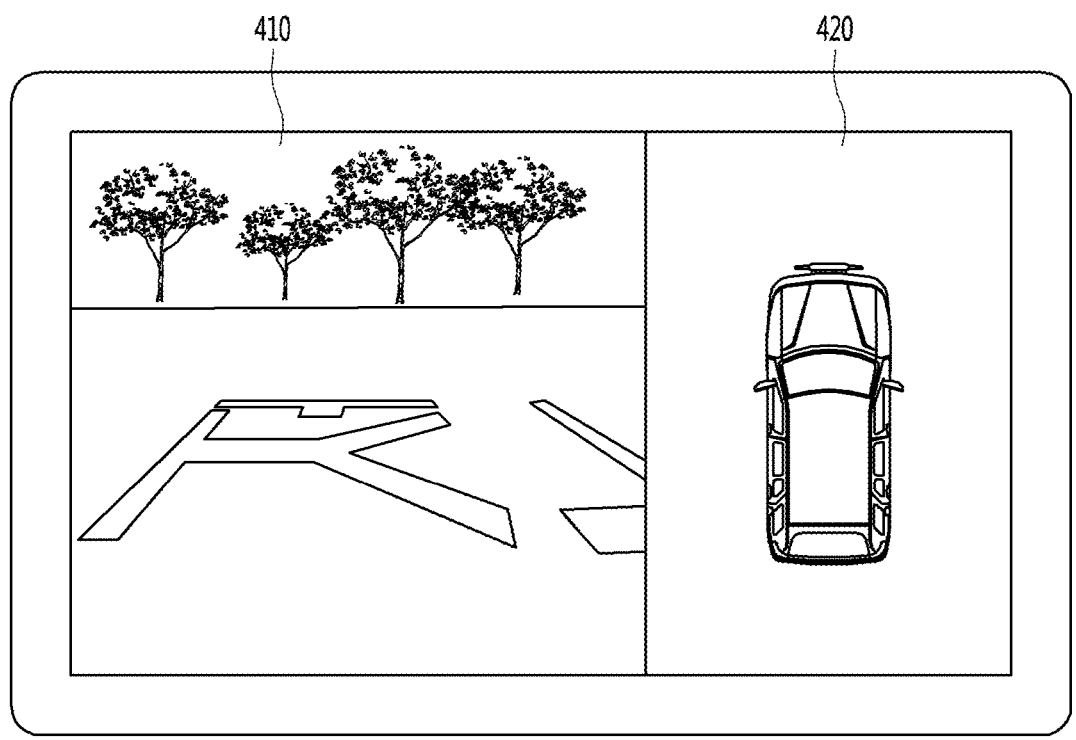
FIG. 13 is a view showing a screen before correction.
Figure 14A:
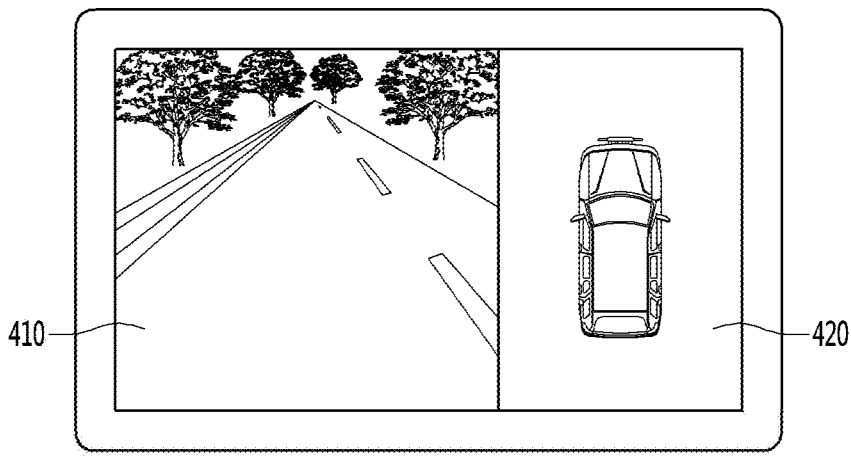
FIGS. 14a-14c are views showing a screen when a vehicle travels for correction.
Figure 14B:
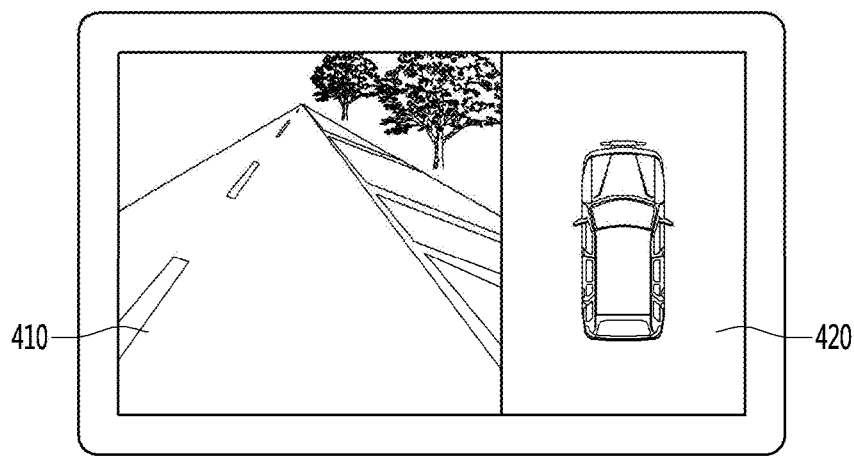
Figure 14C:
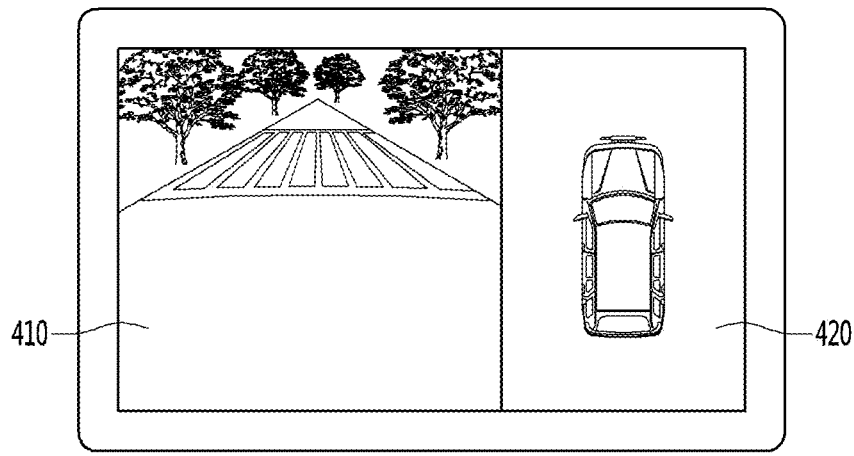
Figure 15A:
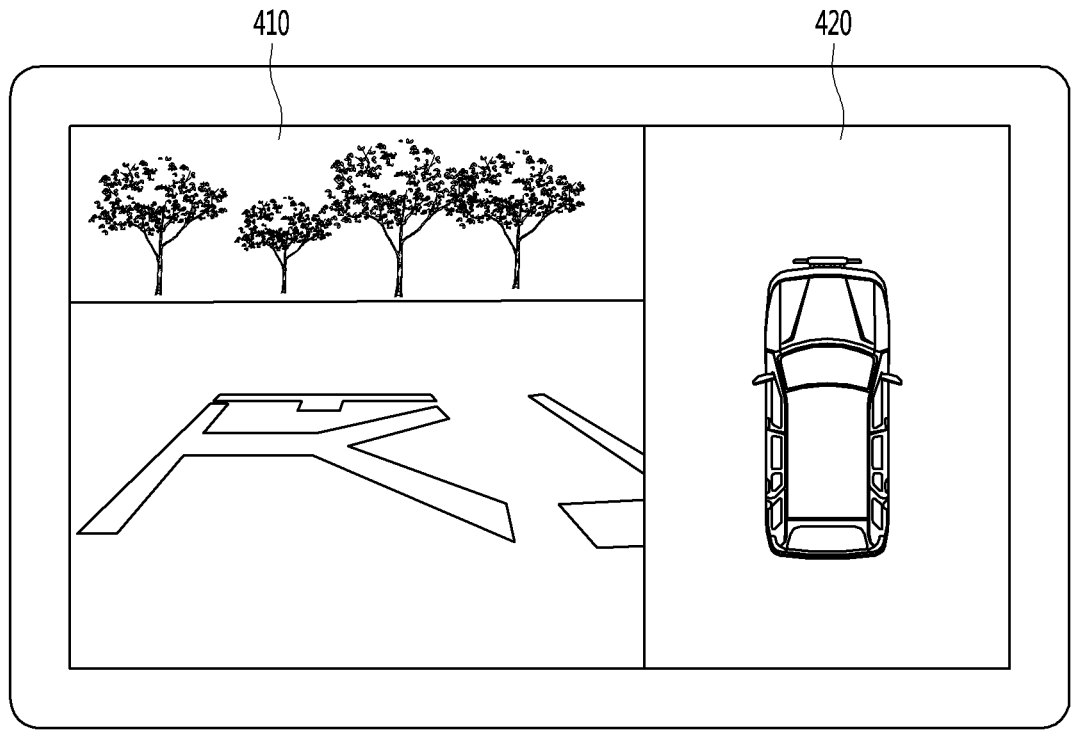
FIGS. 15a-15b are views showing a state of turning off a screen after correction.
Figure 15B:
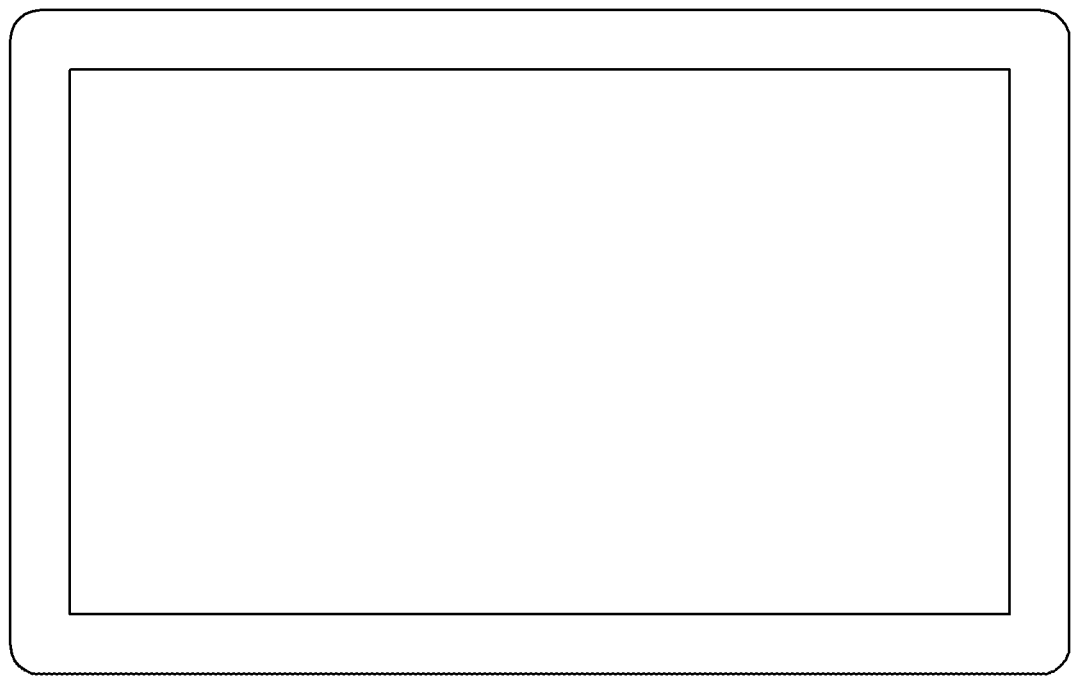
Figure 16:
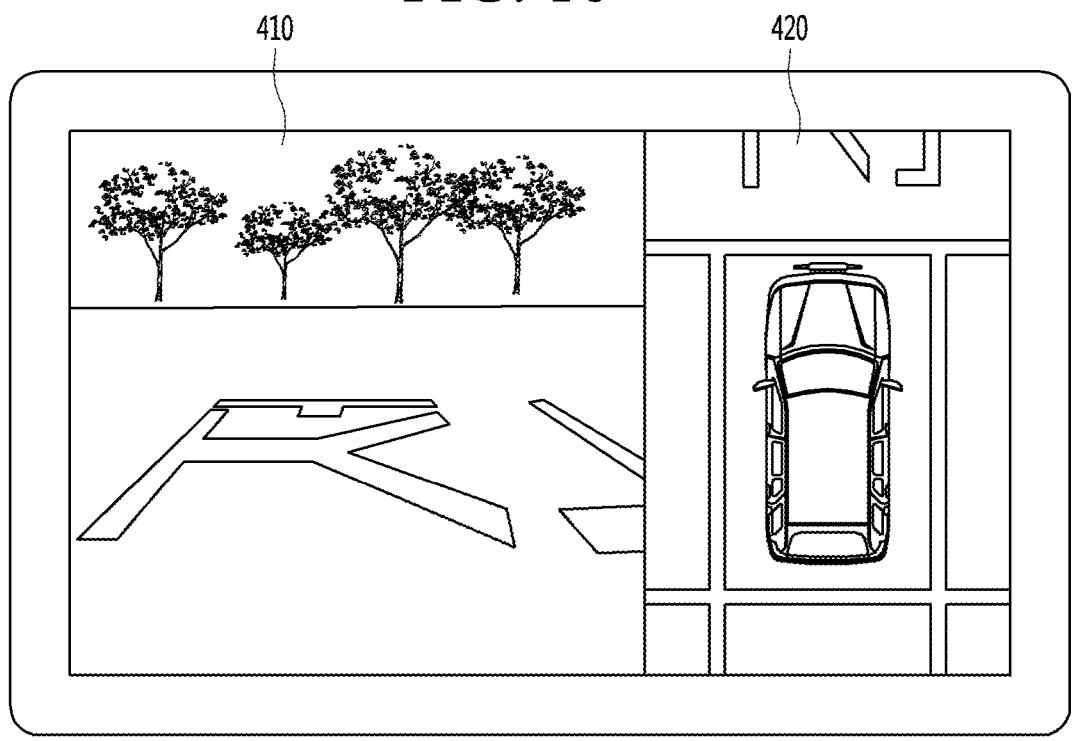
FIG. 16 is a view showing a screen for displaying an updated result.

FIG. 12 is a flowchart illustrating a correction method when image mismatching occurs due to change in external environmental factors, FIG. 13 is a view showing a screen before correction, FIGS. 14a-14c are views showing a screen when a vehicle travels for correction, FIGS. 15a-15b are views showing a state of turning off a screen after correction, and FIG. 16 is a view showing a screen for displaying an updated result.

Referring to FIGS. 1, 5, 7, and 10 to 15b, the processor 170 may determine whether to perform correction due to change in external environmental factors (S1100).

Whether to perform correction due to change in external environmental factors may be determined by input of a specifically defined event signal. For example, when a mode selection button related to correction due to change in external environmental factors is provided on a screen, the mode selection button may be selected. When the mode selection button is selected, an event signal for requesting correction due to change in external environmental factors may be transmitted to the processor 170, and the processor 170 may determine whether to perform correction due to change in external environmental factors through such an event signal.

As described above, change in external environmental factors may include, for example, people riding, external impact, aging, etc. In addition, change in external environmental factors may include replacement of devices for controlling the cameras 160a, 160b, 160c and 160d or the cameras 160a, 160b, 160c and 160d. In addition, change in external environmental factors may include non-correction before a vehicle is released.

When it is determined that correction is performed due to change in external environmental factors, the processor 170 may perform correction step S10 shown in FIG. 5. The correction step S10 may include steps S11 to S21 as shown in FIG. 7. The processor 170 may perform the correction step S10, thereby estimating the optimal matching value.

As shown in FIG. 13, the around-view image in which image mismatching occurs may be displayed on the screen of the display 180. The around-view image in which mismatching occurs may be an image which is not yet corrected. Specifically, the screen may be divided into first and second sub screens 410 and 420 (or regions), for, example, the front or rear image may be displayed on the first sub screen, and the around-view image, in which mismatching occurs, may be displayed on the second sub screen. The first and second sub screens may have the same size or different sizes.

As shown in FIGS. 14a to 14c, the optimal matching value may be estimated while the vehicle is traveling.

When the optimal matching value is estimated, the processor 170 may activate a display off function, such that any information, for example, the previous around-view image is not displayed on the display 180 (S1110). That is, the display of the previous around-view image may be blocked. As another example, the processor 170 may transmit a start off control signal to the ECU using CAN communication and turn off the vehicle under control of the ECU, instead of activation of the display off function, without being limited thereto.

As shown in FIGS. 15*a* and 15*b*, when the optimal matching value is estimated through driving of the vehicle, any around-view image is not provided to the display 180. That is, the processor 170 may activate the display off function such that the around-view image in which mismatching occurs is no longer is provided to the display 180. Therefore, the screen of the display 180 is turned off.

The processor 170 may perform the updating step S50 shown in FIG. 5 in a state of activating the display off function. The updating step S50 may include S51 to S57 as shown in FIG. 10 or S61 to S67 as shown in FIG. 11.

The processor 170 may perform the updating step S10 to update the previous matching value to the optimal matching value or store the optimal matching value separately with the previous matching value and generate the new around-view image (the matched around-view image) based on the optimal matching value. That is, while the display off function is activated, the new around-view image may be generated based on the updated matching value. The generated new around-view image may be stored in the memory 140.

The previous around-view image (the mismatched around-view image) may be updated to the generated new around-view image. The updated new around-view image and the previous around-view image may be deleted.

As another example, the new around-view image may be generated separately from the previous around-view image. The generated new around-view image may be stored in the memory 140 along with the previous around-view image.

The processor 170 may activate the display on function upon recognizing that generation of the new around-view image is completed (S1120), and display the new around-view image on the screen of the display 180 instead of the previous around-view image which has been displayed (S1130). That is, the previous around-view image may be changed to the new around-view image based on the screen.

The embodiment may separately include a display on function and a display off function. In this case, the display on function and the display off function may reversely operate. For example, when the display on function is activated, the display off function may be deactivated.

As another example, the embodiment may include only one of the display on function and the display off function. In this case, the display on/off function may be activated as the display on function or the display off function. If necessary, both the display on function and the display off function may be deactivated, without being limited thereto.

As shown in FIG. 16, when the display on function is activated, the screen of the display 180 may be turned on. When the screen of the display is turned on, the new around-view image may be displayed on the screen of the display 180.

As another example, upon recognizing that generation of the new around-view image is completed, the processor 170 may transmit a start on control signal to the ECU using CAN communication and drive the display 180 to display information, without being limited thereto. Thereafter, the processor 170 may display the new around-view image on the screen of the display 180 instead of the previous around-view image which has been displayed.

As another example, when generation of the new around-view image is completed, for example, it may be notified by voice that generation of the new around-view image is completed. The screen of the display 180 may be turned on in response to an input signal corresponding to manipulation of a touch pad or a button by a driver who has recognized voice notification, or the new around-view image may be displayed on the screen of the display 180 in response to an input signal corresponding to manipulation of a touch pad or a button by a driver who has recognized voice notification.

Hereinafter, a method of correcting image mismatching by self-diagnosis will be described in detail.

Figure 17:
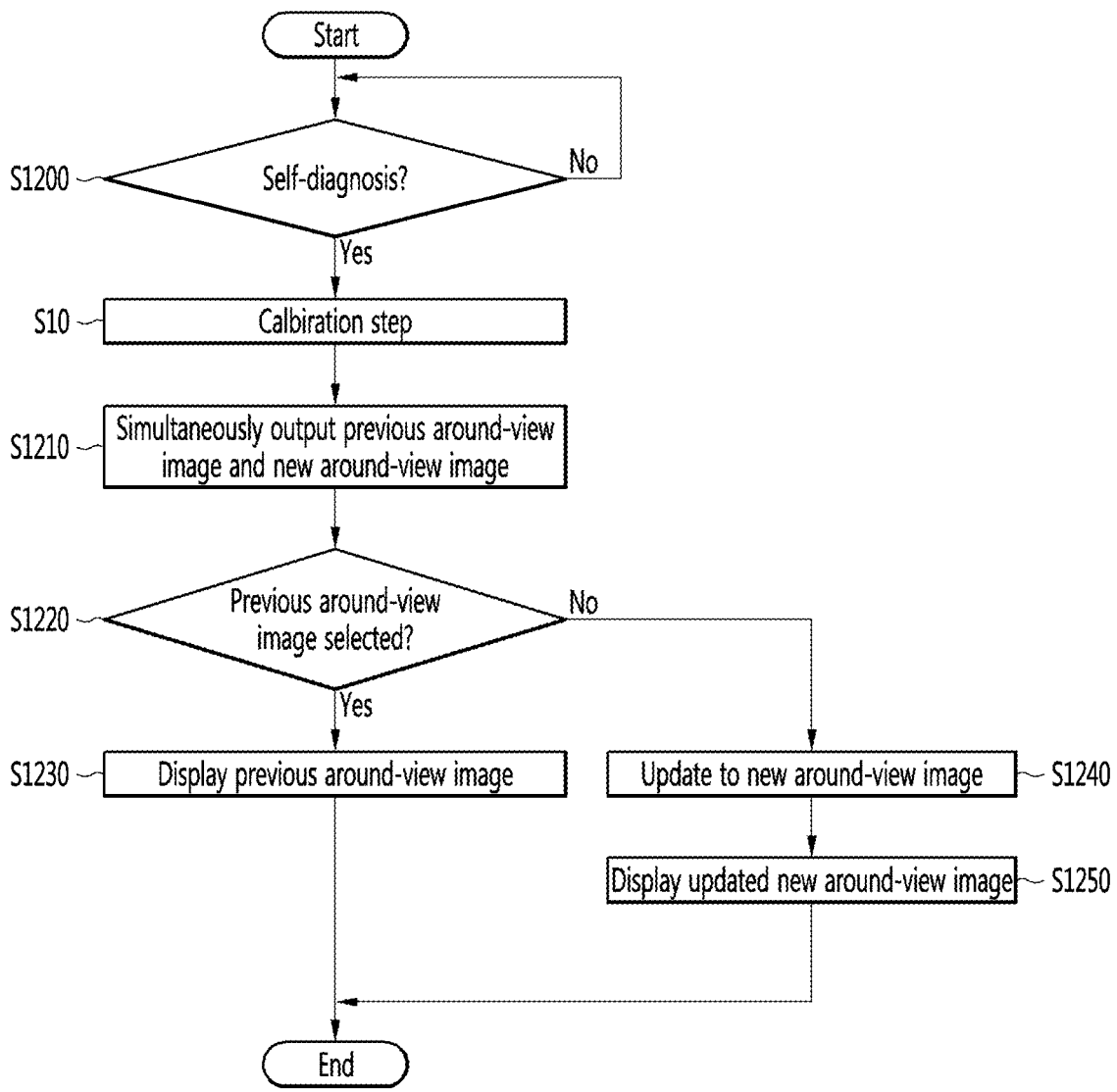
FIG. 17 is a flowchart illustrating a method of correcting image mismatching by self-diagnosis.
Figure 18:
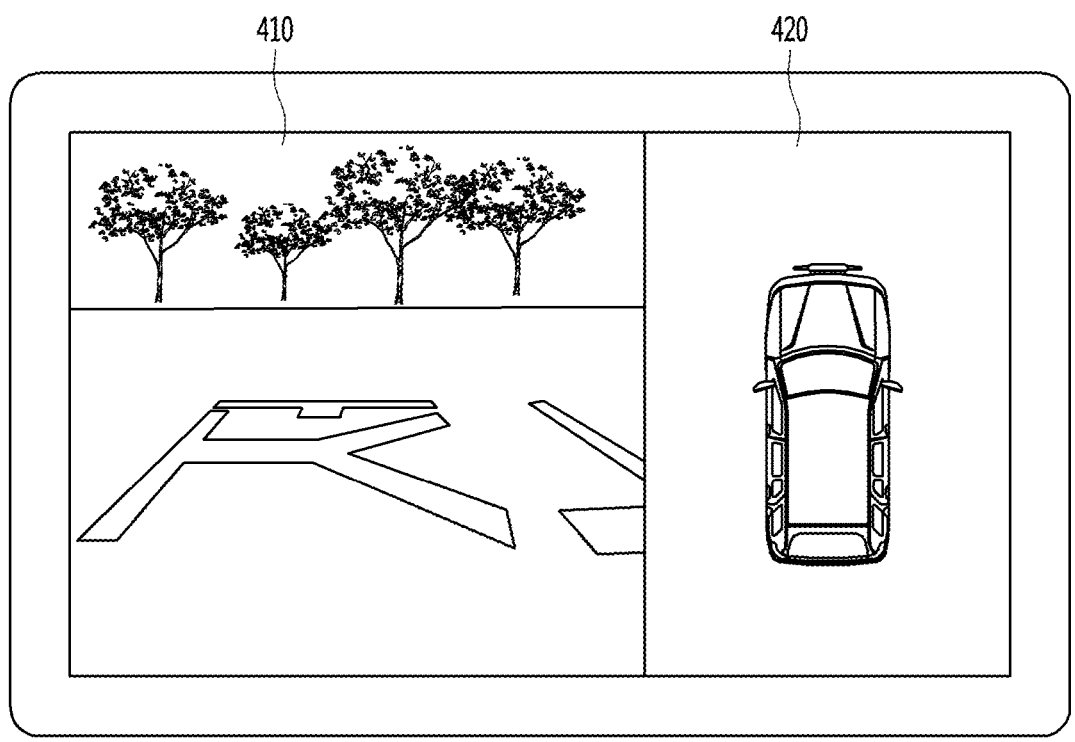
FIG. 18 is a view showing a screen before correction.
Figure 19A:
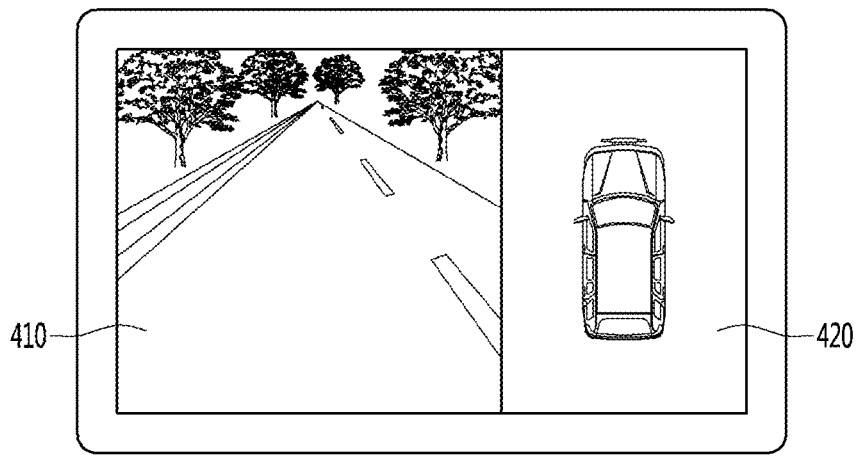
FIGS. 19a-19c are views showing a screen when a vehicle travels for correction.
Figure 19B:
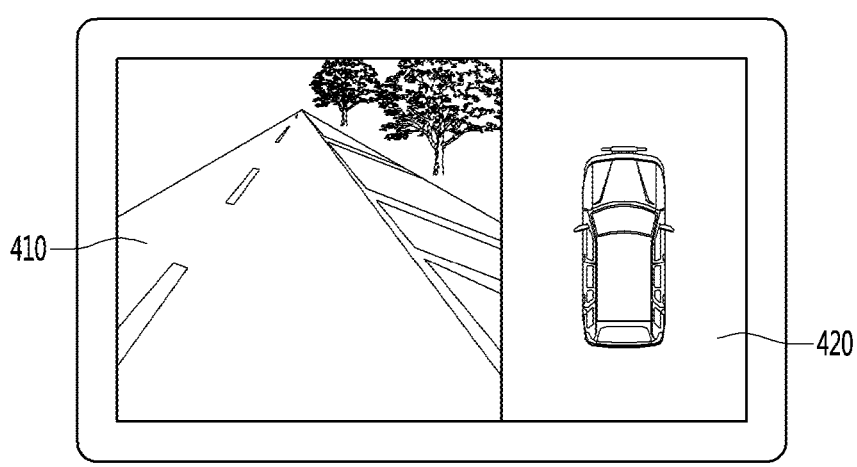
Figure 19C:
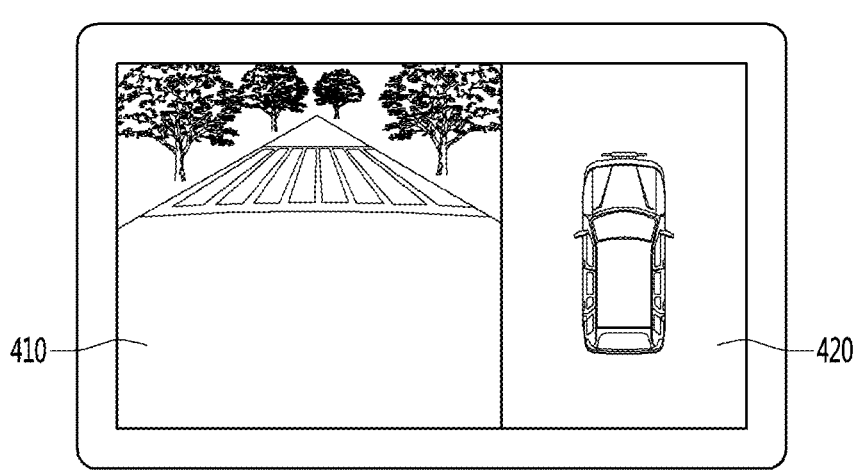
Figure 20A:
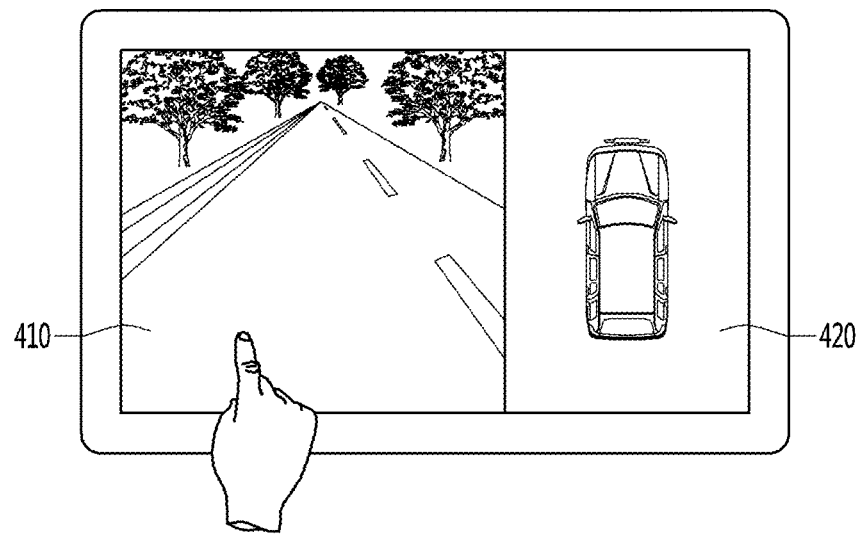
FIGS. 20a-20c are views showing a screen for simultaneously displaying a non-corrected and a corrected image after correction is performed.
Figure 20B:
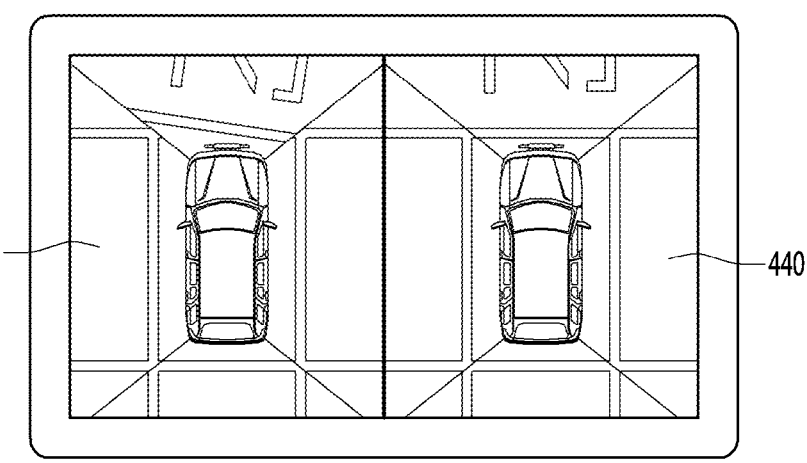
Figure 20C:
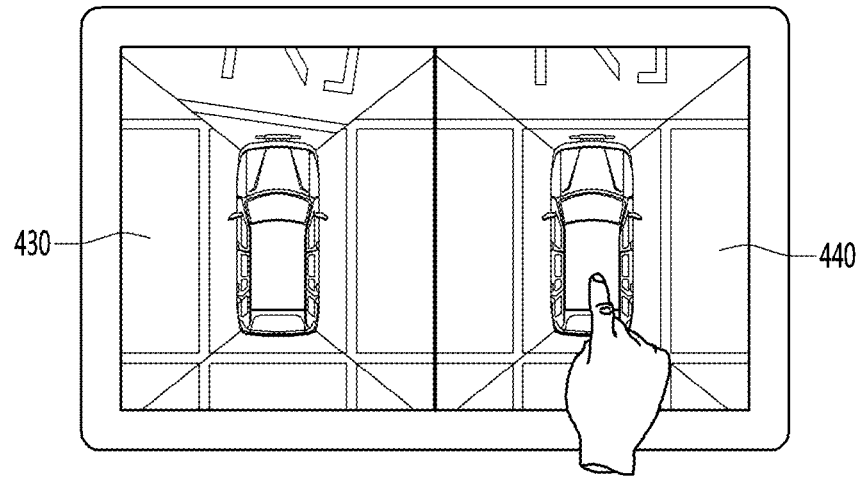
Figure 21:
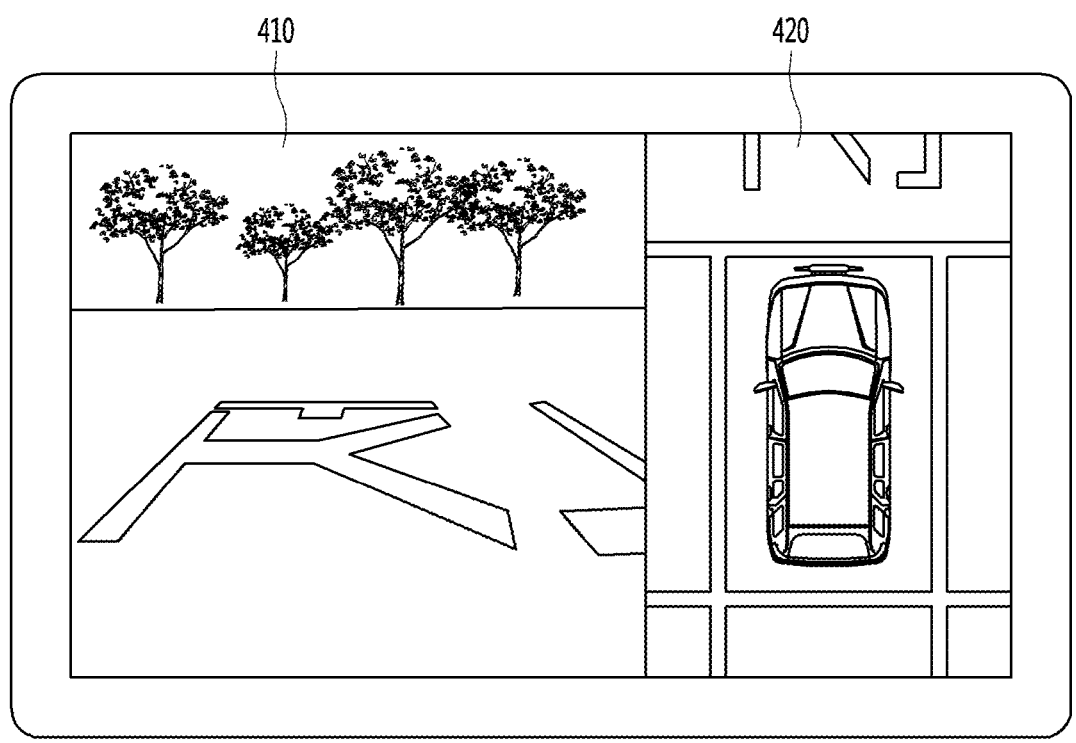
FIG. 21 is a view showing a screen in which a corrected image is selected and an updated image is displayed.

FIG. 17 is a flowchart illustrating a method of correcting image mismatching by self-diagnosis, FIG. 18 is a view showing a screen before correction, FIGS. 19*a*-19*c* are views showing a screen when a vehicle travels for correction, FIGS. 20*a*-20*c* are views showing a screen for simultaneously displaying a non-corrected and a corrected image after correction is performed, and FIG. 21 is a view showing a screen in which a corrected image is selected and an updated image is displayed.

Referring to FIGS. 1, 5, 7 and 17 to 21, the processor 170 may determine whether self-diagnosis is necessary (S1200).

The processor 170 may always check the around-view image provided by an around-view image provider and determine whether self-diagnosis is necessary.

As another example, the processor 170 may perform self-diagnosis according to a predetermined period.

When self-diagnosis is necessary, the processor 170 may perform the correction step S10 shown in FIG. 5. The correction step S10 may include steps S11 to S21 as shown in FIG. 7. The processor 170 may perform the correction step S10, thereby estimating the optimal matching value.

As shown in FIG. 18, the mismatched around-view image may be displayed on the screen of the display 180. For example, the front or rear image may be displayed on the first sub screen and the mismatched around-view image may be displayed on the second sub screen.

As shown in FIGS. 19*a* to 19*c*, the optimal matching value may be estimated while the vehicle is traveling.

The processor 170 may generate the new around-view image based on the estimated matching value and temporarily store the generated new around-view image in the memory 140.

Subsequently, the processor 170 may notify the driver that generation of the new around-view image is completed through voice or an image.

When a display request signal is received from the driver based on such notification, the processor 170 may simultaneously output and display the previous around-view image and the new around-view image on the display 180 (S1210).

As shown in FIG. 20*a*, the display request signal may be received through manipulation of the touch pad or the button on the screen of the display 180 by the driver who has recognized the notification. Accordingly, as shown in FIG. 20*b*, the first and second sub screens 410 and 420 of the screen may be changed to third and fourth sub screens 430 and 440 (or regions) in response to the display request signal. The previous around-view image (the mismatched around-view image) may be displayed on the third sub screen and the new around-view image may be displayed on the fourth sub screen. At this time, the new around-view image may be a completely matched around-view image or an incomplete around-view image. The third and fourth screens may have the same size or different sizes.

As another example, regardless of manipulation of the touch pad or the button, when recognizing that generation of the new around-view image is completed, the processor 170 may control the screen of the display 180 to change the first and second sub screens of the screen to the third and fourth sub screens and simultaneously and respectively display the previous around-view image and the new around-view image on the third and fourth sub screens.

The processor 170 may determine which of the previous around-view image and the new around-view image is selected based on a selection signal received from the driver (S1220).

As shown in FIG. 20c, one of the first sub screen, on which the previous around-view image is displayed, and the second sub screen, on which the new around-view image is displayed, may be selected. Such selection may be made by manipulation of the touch pad or the button. When the screen is selected, the selection signal of the selected screen may be generated and transmitted to the processor 170.

When the selection signal of the previous around-view image is received, the processor 170 may change the third and fourth sub screens to the first and second sub screens and display the previous around-view image on the changed second sub screen (S1230). The front or rear image may be displayed on the first sub screen. In this case, the new around-view image temporarily stored in the memory 140 may be deleted, without being limited thereto.

When the selection signal of the new around-view image is received, the processor 170 may update the new around-view image (S1240). That is, the previous around-view image may be updated to the new around-view image temporarily stored in the memory 140.

The processor 170 may change the third and fourth sub screens of the screen to the first and second sub screens and display the updated new around-view image on the changed second sub screen (S1250). The front or rear image may be displayed on the first sub screen.

As shown in FIG. 21, the new around-view image may be displayed on the screen of the display 180.

If the driver is not satisfied with the updated new around-view image, an input signal for performing additional correction may be generated by additional manipulation of the touch pad. The method may move to S10 by the input signal to perform the correction step again.

Accordingly, the driver may correct the around-view image to their satisfactory level using the around-view image control device 100 while viewing the screen of the display 180.

In the above description, the vanishing point may be referred to as vanishing information, the motion value may be referred to as motion information, and the matching value may be referred to as matching information.

The previous lookup table may be referred to as a first lookup table and the new lookup table may be referred to as a second lookup table.

The previous around-view image may be referred to as a first around-view image and the new around-view image or the updated new around-view image may be referred to as a second around-view image.

A method of processing the around-view image according to an embodiment includes generating a synthesized first around-view image signal using image information acquired from a plurality of cameras, generating a corrected second around-view image signal using image information acquired from the plurality of cameras during a predetermined time, and outputting the second around-view image signal or the first and second around-view image signals.

In addition, the method may further include selecting one of the first and second around-view image signals when the first and second around-view image signals are output, and outputting the selected image signal of the first and second around-view image signals. The method may further include setting automatically to output the second around-view image signal of the first around-view image signal and the second around-view image signal in outputting of the second around-view image signal. The generating of the second around-view image signal may be performed when mismatching of a predetermined range or more is detected in the first around-view image. The first around-view image signal may be generated while a transportation object moves. Simultaneous outputting of the first and second around-view image signals may include outputting in a state in which the transportation object is stopped.

An around-view image control device includes a plurality of cameras, and a controller electrically connected to the cameras and configured to control an image signal using information acquired from the cameras. The controller may be configured to generate a synthesized first around-view image signal using image information acquired from the plurality of cameras, generate a corrected second around-view image signal using image information acquired from the plurality of cameras during a predetermined time, and output the second around-view image signal or the first and second around-view image signals. In this case, the output signal may be transmitted to a display, thereby outputting an image. The controller may be configured to receive selection of one of the first and second around-view image signal and output the selected image signal of the first and second around-view image signals, when the first and second around-view image signals are output. The controller may be configured to block output of the first around-view image signal when the corrected second around-view image signal is generated using the image information acquired from the plurality of cameras during the predetermined time, and output the second around-view image signal. The controller may be configured to output the first around-view image signal and the second around-view image signal, when the second around-view image signal is generated and output the selected image signal, when a selection signal of one of the first around-view image and the second around-view image signal is received.

The detailed description is to be construed in all aspects as illustrative and not restrictive. The scope of the embodiments should be determined by the appended claims and their legal equivalents, not by the above description, and all changes coming within the meaning and equivalency range of the appended claims are intended to be embraced therein.

INDUSTRIAL APPLICABILITY

Embodiments are applicable to movable objects. Examples of such moving objects include vehicles, etc.

The invention claimed is:
1. A method of processing an around-view image, the method comprising:
  determining whether a vehicle is traveling;
  when the vehicle is determined to be traveling, generating a first around-view image signal by synthesizing a plurality of images respectively acquired by a plurality of cameras mounted on the vehicle into one image while the vehicle is traveling;
  calculating a mismatch value based on the plurality of images respectively acquired by the plurality of cam- eras during a predetermined time and estimating an optimal mismatch value based on the calculated mismatch value;

outputting a corrected second around-view image signal or the first around-view image signal and the corrected second around-view image signal, selecting one of the first around-view image signal and the corrected second around-view image signal when the first around-view image signal and the corrected second around-view image signal are output; and outputting the selected image signal of the first around-view image signal and the corrected second around-view image signal;

wherein the estimating an optimal mismatch value comprises estimating an optimal matching value by a Gaussian model based on a plurality of continuously obtained matching values, and when matching of a current image occurs and an angle of one of the plurality of cameras or a view point angle of one of the images is set, a majority of matching values converge on the set angle, wherein the plurality of matching values continuously obtained are calculated based on yaw, roll, and pitch rotation angle information and information of X, Y, and Z axes, wherein when the optimal matching value is being estimated, the outputting the first around-view image signal is disabled, wherein the calculating of the mismatch value comprises determining whether a vanishing point is stabilized by determining whether a position change of the vanishing point in the plurality of images respectively acquired by the plurality of cameras is in a first predetermined range and when the vanishing point is determined to be stabilized, calculating a matching value based on a motion value calculated based on temporal changes between images of the plurality of images, and wherein when the vanishing point is determined to be at a center of each of the plurality of images respectively acquired by the plurality of cameras, a ground state is determined to be flat.

2. The method of claim 1, comprising setting automatically to output the corrected second around-view image signal of the first around-view image signal and the corrected second around-view image signal.

3. The method of claim 1, wherein the generating of the corrected second around-view image signal is performed when the vanishing point is not the center of each of the plurality of images respectively acquired by the plurality of cameras in the first around-view image.

4. The method of claim 1, wherein the first around-view image signal is generated while a transportation object moves.

5. The method of claim 4, wherein simultaneously outputting of the first around-view image signal and corrected second around-view image signal includes outputting in a state in which the transportation object is stopped.

6. An around-view image control device comprising:
a plurality of cameras mounted on a vehicle; and
a processor connected to the cameras and configured to control an image signal based on information acquired from the cameras,
wherein the processor is configured to:
determine whether the vehicle is traveling;
when the vehicle is determined to be traveling, generate a first around-view image signal by synthesizing a plurality of images respectively acquired by the plurality of cameras while the vehicle is traveling, calculate a mismatch value based on the plurality of images respectively acquired by the plurality of cameras during a predetermined time and estimating an optimal mismatch value based on the calculated mismatch value; and output a corrected second around-view image signal or the first around-view image signal and corrected second around-view image signal;

wherein the estimating an optimal mismatch value comprises estimating an optimal matching value by a Gaussian model based on a plurality of continuously obtained matching values, and when matching of a current image occurs and an angle of one of the plurality of cameras or a view point angle of one of the images is set, a majority of matching values converge on the set angle, wherein the matching values continuously obtained are calculated based on yaw, roll, and pitch rotation angle information and information of X, Y, and Z axes, wherein when the optimal matching value is being estimated, the outputting the first around-view image signal is disabled, wherein the calculating of the mismatch value comprises determining whether a vanishing point is stabilized by determining whether a position change of the vanishing point in the plurality of images respectively acquired by the plurality of cameras is in a first predetermined range and when the vanishing point is determined to be stabilized, calculating a matching value based on a motion value calculated based on temporal changes between the images of the plurality of images, and wherein when the vanishing point is determined to be at a center of each of the plurality of images respectively acquired by the plurality of cameras, a ground state is determined to be flat.

7. The around-view image control device of claim 6, wherein the processor is configured to receive selection of one of the first around-view image signal and the corrected second around-view image signal and output the selected image signal of the first around-view image signal and the corrected second around-view image signal, when the first around-view image signal and the corrected second around-view image signal are output.

8. The around-view image control device of claim 6, wherein the processor is configured to:
block output of the first around-view image signal when the corrected second around-view image signal is generated based on the image information acquired from the plurality of cameras during the predetermined time, and
output the corrected second around-view image signal.

9. The around-view image control device of claim 7, wherein the processor is configured to:
output the first around-view image signal and the corrected second around-view image signal, when the corrected second around-view image signal is generated, and
output the selected image signal, when a selection signal of one of the first around-view image signal and the corrected second around-view image signal is received.

10. The method of claim 6, wherein the processor is configured to:
estimate an optimal matching value by a Gaussian model based on a plurality of continuously obtained matching values.

11. A method of processing an around-view image, the method comprising:

- determining whether a vehicle is traveling;
- when the vehicle is determined to be traveling, generating a first around-view image signal by synthesizing a plurality of images respectively acquired by a plurality of cameras mounted on the vehicle into one image while the vehicle is traveling;
- calculating a mismatch value based on the plurality of images respectively acquired by the plurality of cameras during a predetermined time and estimating an optimal mismatch value based on the calculated mismatch value;
- outputting a corrected second around-view image signal or the first around-view image signal and the corrected second around-view image signal,
- selecting one of the first around-view image signal and the corrected second around-view image signal when the first around-view image signal and the corrected second around-view image signal are output; and
- outputting the selected image signal of the first around-view image signal and the corrected second around-view image signal;
- wherein the estimating an optimal mismatch value comprises estimating an optimal matching value by a Gaussian model based on a plurality of continuously obtained matching values, and when matching of a current image occurs and an angle of one of the plurality of cameras or a view point angle of one of the images is set, a majority of matching values converge on the set angle,
- wherein the calculating of the mismatch value comprises determining whether a vanishing point is stabilized determining whether time duration for a position change of the vanishing point in the plurality of images respectively acquired by the plurality of cameras is in a predetermined range is in a first predetermined range of time and when the vanishing point is determined to be stabilized, calculating a matching value based on a motion value calculated based on temporal changes between images of the plurality of images, and
- wherein when the vanishing point is determined to be at a center of each of the plurality of images respectively acquired by the plurality of cameras, a ground state is determined to be flat.

* * * * *